(12) United States Patent
Zack et al.

(10) Patent No.: US 11,793,131 B1
(45) Date of Patent: Oct. 24, 2023

(54) APPARATUS, METHODS, AND SYSTEMS FOR PROVIDING AN INDOOR GARDENING, HOUSEHOLD APPLIANCE

(71) Applicant: Graystone Technology and Consulting LLC, Sheridan, WY (US)

(72) Inventors: Steven Alan Zack, Mercer Island, WA (US); James Nagel, Coupeville, WA (US)

(*) Notice: Subject to any disclaimer, the term of this patent is extended or adjusted under 35 U.S.C. 154(b) by 0 days.

(21) Appl. No.: 18/205,797

(22) Filed: Jun. 5, 2023

Related U.S. Application Data

(60) Provisional application No. 63/478,771, filed on Jan. 6, 2023.

(51) Int. Cl.
*A01G 31/02* (2006.01)
*A01G 3/02* (2006.01)
*A01G 31/06* (2006.01)

(52) U.S. Cl.
CPC ............... *A01G 3/02* (2013.01); *A01G 31/06* (2013.01)

(58) Field of Classification Search
CPC ............ A01G 2031/006; A01G 31/047; A01G 31/06; A01G 27/001; A01G 27/003; A01G 27/005; A01G 27/006; A01G 27/02; A01G 9/24; A01G 9/249; A01G 9/247; A01G 9/26; A01G 9/027; A01G 7/045; Y02P 60/21
See application file for complete search history.

(56) References Cited

U.S. PATENT DOCUMENTS 7,134,240 B1 * 11/2006 Neal .................. A01G 31/02
47/60
7,188,451 B2 * 3/2007 Marchildon ......... A01G 31/047
47/62 R
(Continued)

FOREIGN PATENT DOCUMENTS

BG      66788 B1    11/2018
CN   109566385 A     4/2019
(Continued)

OTHER PUBLICATIONS

Ryan Ruikkie, "Incredible Rotating NASA-Inspired Indoor Garden Provides Full Garden in Just 1.7 Feet", article, Mar. 19, 2020.

*Primary Examiner* — Trinh T Nguyen
(74) *Attorney, Agent, or Firm* — Derek Fahey, Esq.; The Plus IP Firm, PLLC

(57) ABSTRACT

In one embodiment, an indoor gardening household appliance system is disclosed. The system includes a housing, having a front side and a plurality of enclosed sides, a front side opening, a rotatable tubular shaped wall within the housing that is concentric with the opening, a backplate in attachment with the back side of the rotatable tubular shaped wall, a plurality of drawers, and at least one stop engaging a grow drawer such that the grow drawer is retained within the interior compartment. The stop includes a locked configuration for retaining the drawers within the interior compartment and an unlocked configuration for allowing a drawer to move into and out of the interior compartment. The system further includes a locked configuration having grow drawers disposed about a top arc section of the opening, and an unlocked configuration having a grow drawer disposed within the bottommost arc section of the opening.

20 Claims, 24 Drawing Sheets

(56) References Cited

U.S. PATENT DOCUMENTS

| | | | |
|---|---|---|---|
| 7,401,437 B2* | 7/2008 | Dumont | A01G 31/047 47/62 C |
| 7,730,663 B2* | 6/2010 | Souvlos | A01G 31/047 47/62 N |
| 2002/0144461 A1* | 10/2002 | Marchildon | A01G 31/047 47/65.5 |
| 2004/0060491 A1* | 4/2004 | Leduc | A01G 31/047 111/105 |
| 2005/0011119 A1* | 1/2005 | Bourgoin | A01G 31/047 47/61 |
| 2007/0251145 A1* | 11/2007 | Brusatore | A01G 31/047 47/58.1 FV |
| 2010/0236147 A1* | 9/2010 | Brusatore | A01G 31/047 47/65 |
| 2012/0124904 A1 | 5/2012 | Marchildon | |
| 2016/0360711 A1* | 12/2016 | Vesty | A01G 31/047 |
| 2017/0099792 A1* | 4/2017 | Gallant | A01G 7/02 |
| 2019/0133064 A1 | 5/2019 | Fyvolent et al. | |
| 2019/0335681 A1* | 11/2019 | Oberthier | B65G 23/24 |
| 2019/0343056 A1 | 11/2019 | Brown | |
| 2021/0100178 A1 | 4/2021 | Schmutzer | |

FOREIGN PATENT DOCUMENTS

| | | | | |
|---|---|---|---|---|
| CN | 216906079 U | 7/2022 | | |
| CN | 115176690 A | 10/2022 | | |
| EP | 2600708 B1 | 3/2010 | | |
| EP | 3560328 A1 * | 10/2019 | | A01G 31/047 |
| JP | H07289104 A | 11/1995 | | |
| KR | 102218344 B1 | 2/2021 | | |
| WO | 2022015752 A1 | 1/2022 | | |
| WO | 2022103113 A1 | 5/2022 | | |

* cited by examiner

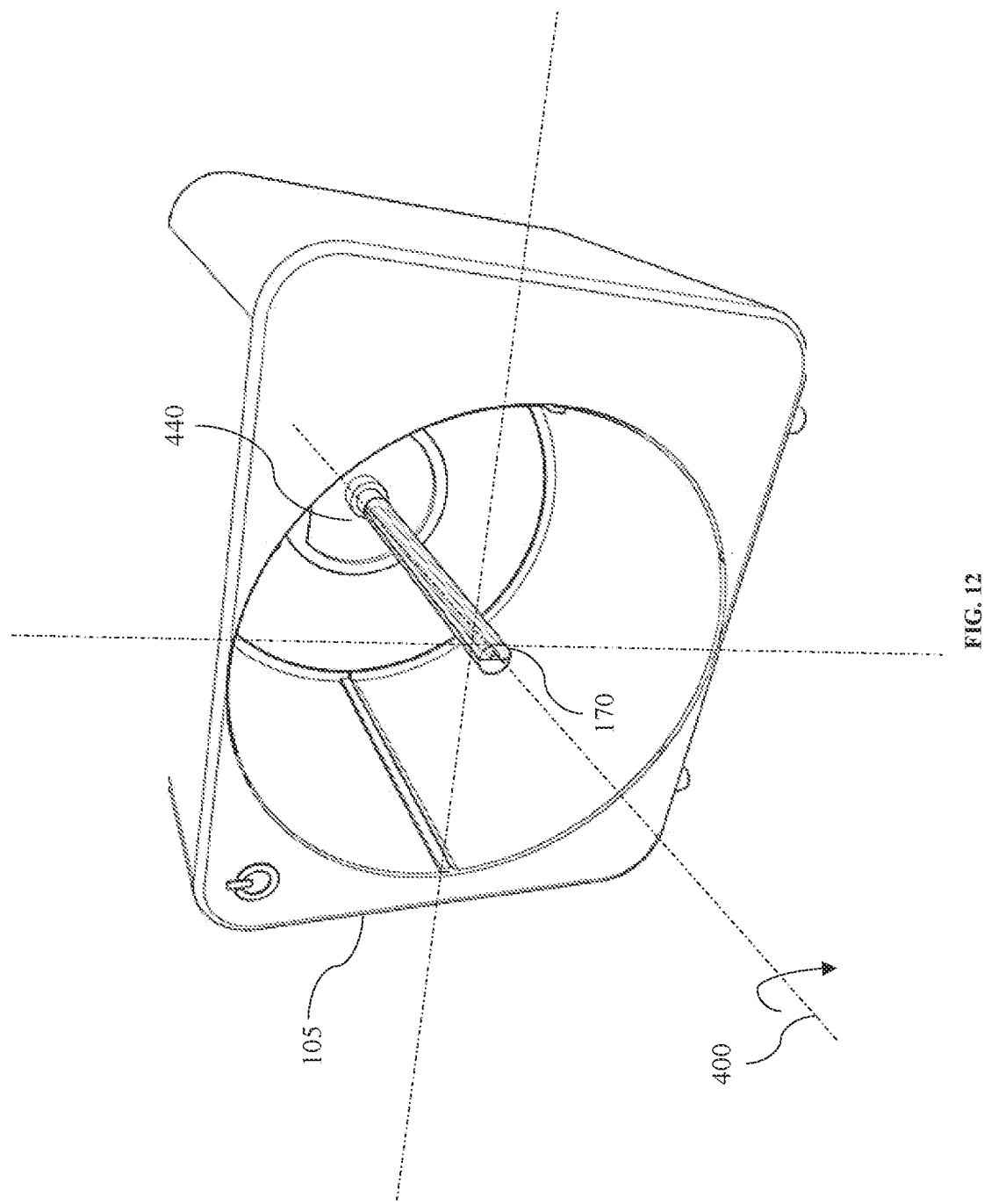

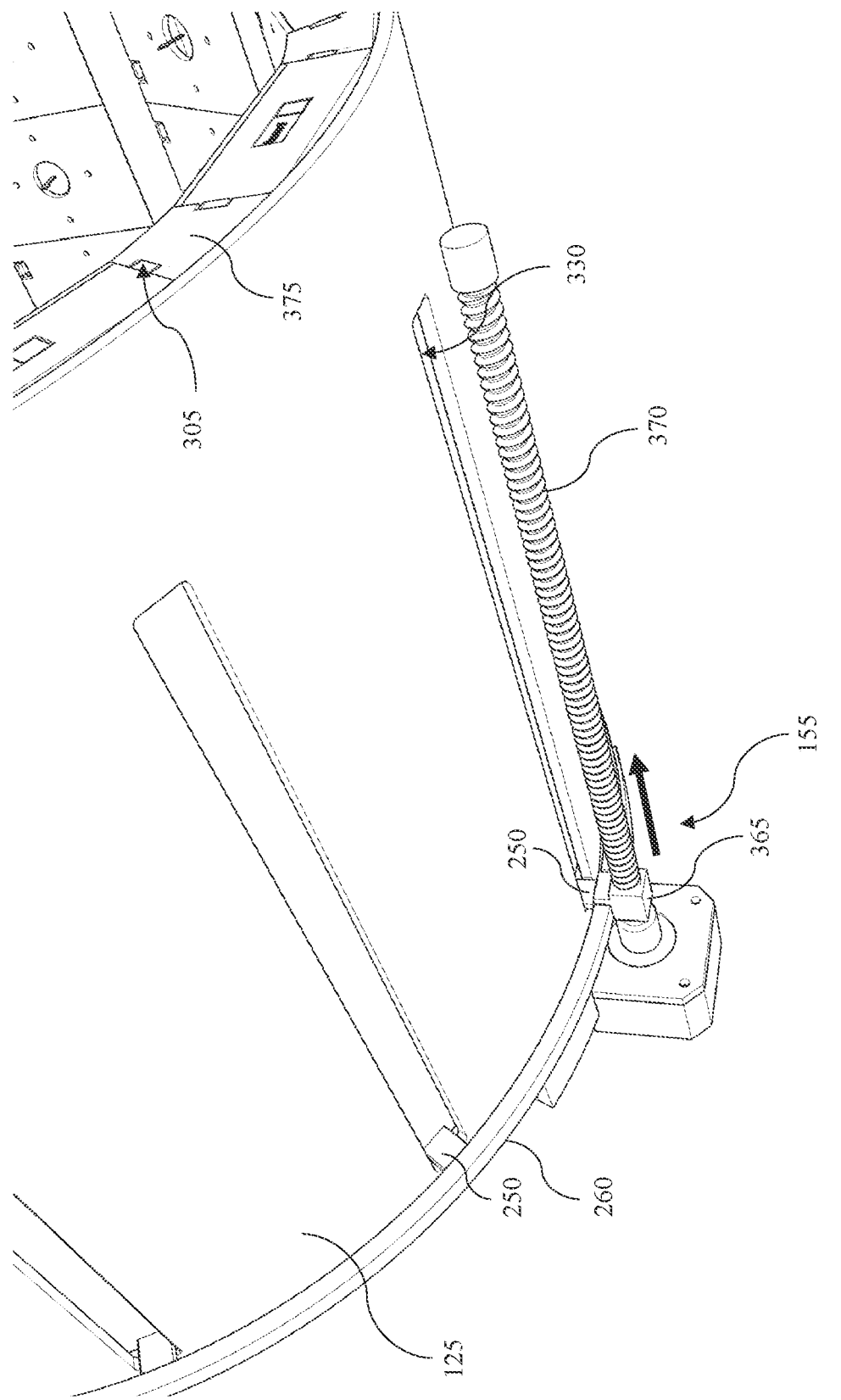

APPARATUS, METHODS, AND SYSTEMS FOR PROVIDING AN INDOOR GARDENING, HOUSEHOLD APPLIANCE

REFERENCE TO RELATED APPLICATIONS

This application claims the benefit of U.S. Provisional Application Ser. No. 63/478,771 entitled "SPACE FARM FRESH CUT 2.0" and filed Jan. 6, 2023, the subject matter of which is incorporated herein by reference.

CROSS-REFERENCES

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD

The present disclosure relates to the field of indoor gardening, and more specifically compact kitchen appliances for growing plants and vegetables for consumption or various uses.

BACKGROUND OF THE INVENTION

In recent years, there has been a significant increase in consumers' interest to grow and harvest food and plants for oneself or family. The reason for an individual to pursue the act of farming varies case by case however it is undeniable that sustainable living is growing in popularity and will only increase as people become more aware of the downsides of purchasing produce from big chain stores. For example, large scale industrial agriculture often relies on pesticides and chemicals for protection against environmental factors. Consumers often forget to thoroughly wash their produce purchased from these stores, unintentionally exposing themselves to acute poisoning, chronic health effects, and allergic reactions. Furthermore, produce that is shipped to stores is often harvested before being fully ripe in order to withstand transportation and storage. By doing this, the plant does not fully develop all of its nutrients as it would when ripe. Regarding its nutritional composition, produce that is harvested prematurely and subjected to prolonged storage periods can experience significant flavor degradation. This degradation can arise from enzymatic activity, where the continued action of enzymes present in fruits and vegetables leads to the breakdown of complex flavor compounds, including sugars, amino acids, and volatile compounds. Furthermore, adverse environmental conditions such as fluctuations in temperature, humidity, and exposure to oxygen during extended storage can hasten chemical reactions that contribute to flavor deterioration. Additionally, premature harvesting may impede the natural ripening process, diminishing the development of vibrant and pronounced flavors. These are just some of the problems with traditional farming.

In addition to the direct effect consumers face when purchasing from these large agriculture businesses, are the issues facing our food supply chain when these businesses mass produce plants and produce for profit. These issues include food loss and waste driving up consumer costs, increasing pollution, and waste of valuable resources. An estimated 57% of food loss is attributed to issues from agricultural production, processing and packaging, and retail distribution. Roughly 43% of food is wasted at the consumer level from food spoilage, damage, over purchase, etc. Current solutions to these issues with traditional agriculture include reducing water consumption by using indoor greenhouses, reducing farm to market travel distances, using inert gas and resilient packages to slow rot and damage, and composting old fruits and vegetables to reduce food waste.

On the other hand, personal indoor farming has also gained popularity, however this method also has disadvantages and can require much more work than anticipated by the average homeowner. For example, some methods include using planters or pots with gardening soil or other substrates for the plants to root in. Additionally, some areas require additional light in order for the plants to survive the darker winter months. Other types of indoor gardens utilize a method of growing plants known as hydroponics. This method involves the use of water and a fast-draining media, such as rock or some type of open cell foam, in order to give the plant roots a place to absorb water. This type of growing also generally requires adding some type of nutrients to the water in order for the plants to get the nutrition that they would normally get from the soil. These nutrients are normally added to the water in a predetermined amount based on some instruction from the manufacturer or some other source of information such as books, magazines, or videos.

In most, if not all, of these methods, the user is heavily involved in making choices about gardening although they may not be familiar with the processes or have much knowledge about growing plants. Knowing which plants require which nutrients, light sources, watering schedules, expected growth rates, or safe amounts to harvest without causing injury or death to the plants are just some of the difficulties faced by novice and lightly skilled indoor gardeners. More recently, the market is being flooded with small, countertop units that utilize built-in growing lights with areas in the bottom of the container for water to keep the soil or grow media saturated while the plants germinate and sprout. Many of these latter units are utilized for herbs and small vegetables for in-home gardens. The amount of counter space for these types of gardens is directly proportional to the amount of growing area for the plants. For instance, a one square foot area of counterspace may produce up to 90% of that area (or 0.9 square feet) for plant growing in the units available today. In addition to small countertop units, commercial applications of rotational vertical farming technology are also proven to be efficient. However, the current art using this technology requires too large of space for residential applications, and too complex of systems and industrial controls for the average consumer.

As a result, there exists a need for improvements over the prior art and more particularly for a household appliance for growing produce at home that is cost effective, easy to use, and compact.

BRIEF SUMMARY OF THE INVENTION

An apparatus, method, and system for providing an indoor gardening, household appliance is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an indoor gardening household appliance system is disclosed. The system comprises a housing, having a front side and a plurality of enclosed sides, an opening on the front side, a rotatable tubular shaped wall within the housing that is concentric with the opening, a backplate in attachment with the back side of the rotatable tubular shaped wall, a plurality of drawers, and at least one stop removably engaging a grow drawer such that the grow drawer is retained within the interior compartment of the rotatable tubular shaped wall. The stop includes a locked configuration for maintaining the drawers within the interior compartment and an unlocked configuration for allowing a drawer to be movable into and out of the interior compartment. The system further includes a locked configuration comprising a plurality of grow drawers disposed about a top arc section 216 (shown in FIG. 3) of the opening, and an unlocked configuration comprising a grow drawer disposed within the bottommost arc section of the opening.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 12 is a perspective view of the indoor gardening household appliance system illustrating the axis of rotation, according to an example embodiment;

FIG. 13 is a bottom perspective view of the rotatable tubular wall while in locked configuration, according to an example embodiment;

Figure 1:
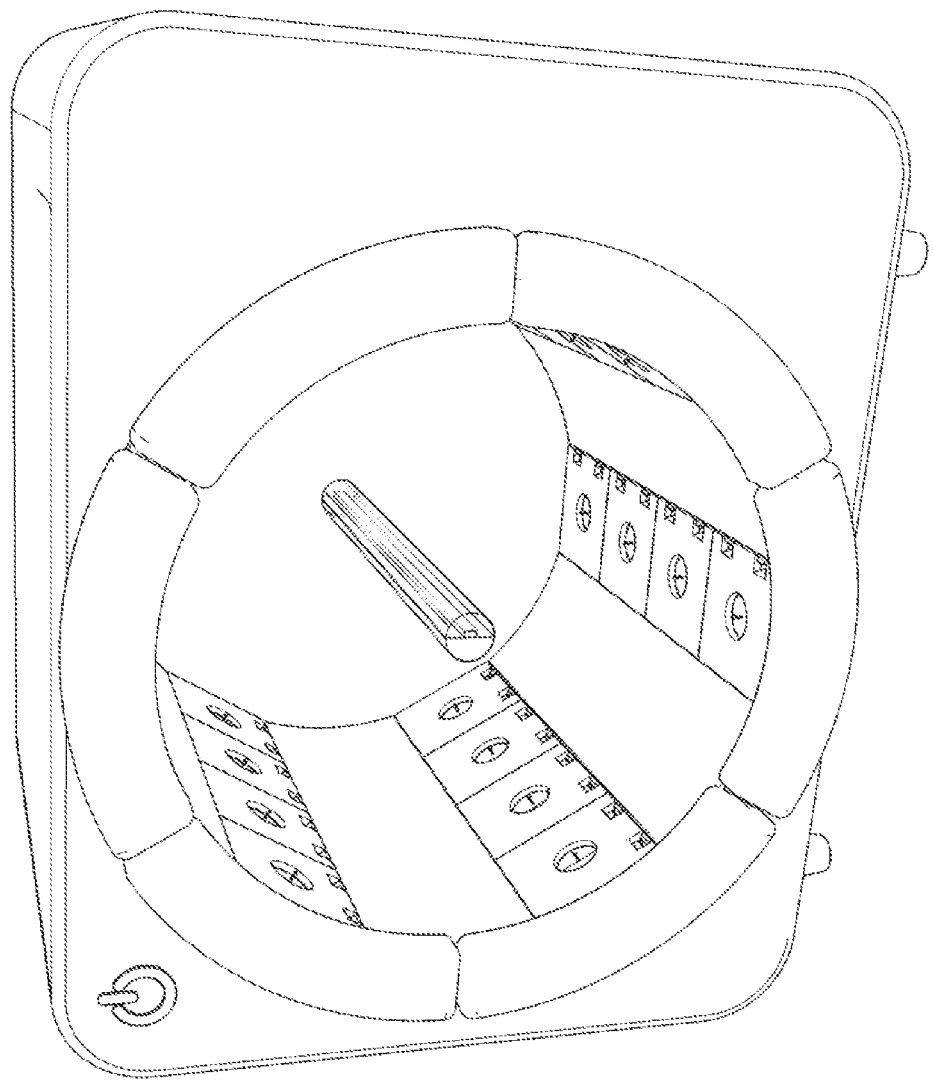
FIG. 1 is a perspective view of an indoor gardening household appliance system, according to an example embodiment.

The drawings and figures referred to herein are provided solely for illustrative purposes of an example embodiment, and it should be understood that alternate embodiments may exist. While the figures accompanying this disclosure are drawn to scale in the example embodiment, it is important to note that this may not necessarily be the case in all embodiments. The proportional representation depicted in the figures is intended to assist in conveying the concept and functionality of the invention but should not be construed as limiting the scope or scale of the invention in any way. Various modifications and alterations to the figures, including changes in dimensions and proportions, may be made without departing from the broader scope of the invention. Therefore, the disclosure is not limited to the precise details and dimensions depicted in the accompanying figures and should be interpreted in view of the overall disclosure and the full scope of the appended claims.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for providing an indoor gardening, household appliance. As mentioned above, the prior art consists of large commercial grade rotational vertical farming. These systems require extensive knowledge and space to successfully grow and harvest plants and produce. The disclosed indoor gardening household appliance solves the issue of space required and education. The present disclosure utilizes a cylindrical growing area increasing the efficiency of counterspace used by a factor of nearly three times the standard garden area. A one square foot space could provide the same growth area as up to three square feet due to the shape and design of the cylinder. If bisected and laid out flat, a standard cylinder shape would be about 3.14 (or pi) times wider than the diameter of the original cylinder giving the consumer the advantage of a larger indoor garden without having to utilize more space.

Furthermore, the present disclosure proves advantageous over the prior art by its design of the rotating drum. The rotating drum, in which the plants are growing, slowly spins, providing the plants with a complete exposure to the various effects of gravity. This method of farming has been shown to increase the transport of nutrients and water throughout the plant as it grows. The central grow light located within the drum is also programmed such that the plants may receive the most efficient amounts of light to propagate the best growing cycles of the various plants. The grow light assembly includes an illuminated rod disposed within the rotatable drum assembly and affied to the center of the axis of rotation. As the inner drum rotates, the plants receive water through the use of a central watering system. This system provides water and nutrients to the plants at specific intervals and allows the growth substrate to maintain a predetermined level of saturation continually. By using this type of hydroponic growing method, the plants are undergoing a controlled growth cycle that maintains the highest efficiency in order to provide the most vegetation with the least amount of energy input while preventing other issues (such as mold) from inhabiting the growth area.

The disclosed system also improves over the prior art by utilizing "smart appliance" features, such as connecting to a mobile device app or personal computer application with the use of wireless technology. This allows the end user to input what plants are being planted, where and when they are input into the appliance. It also provides the end user with data about their garden such as growth cycle, time to harvest, meal planning based on specific plant varieties and availability in the unit, grow light control for the various plants, and feedback from the machine for regular maintenance, water storage levels, and troubleshooting.

Additionally, the system further improves over the prior art by having a stopping mechanism or process used to form a locked configuration and an unlocked configuration. These two configurations are vital to the overall system. The locked configuration ensures the drawers are stable and secure while in rotation, while the unlocked configuration allows a drawer to be removed from the interior compartment of the drum and easily accessed by the user.

Referring now to the Figures, specifically FIG. 1, which is presented herein as a front perspective view, there is depicted an exemplary embodiment of an indoor gardening, household appliance system 100. It should be noted that the figures and accompanying descriptions provided herein are intended to elucidate the operational and visual aspects of the system in accordance with a variety of example embodiments. In subsequent figures and descriptions, additional details will be presented to elucidate the operational characteristics and visual attributes of the indoor gardening, household appliance system 100 across a plurality of example embodiments. It is important to note that the embodiments depicted in the figures are provided for illustrative purposes, and variations in the system's structure, configuration, and appearance may be employed without departing from the broader scope of the invention.

Figure 2:
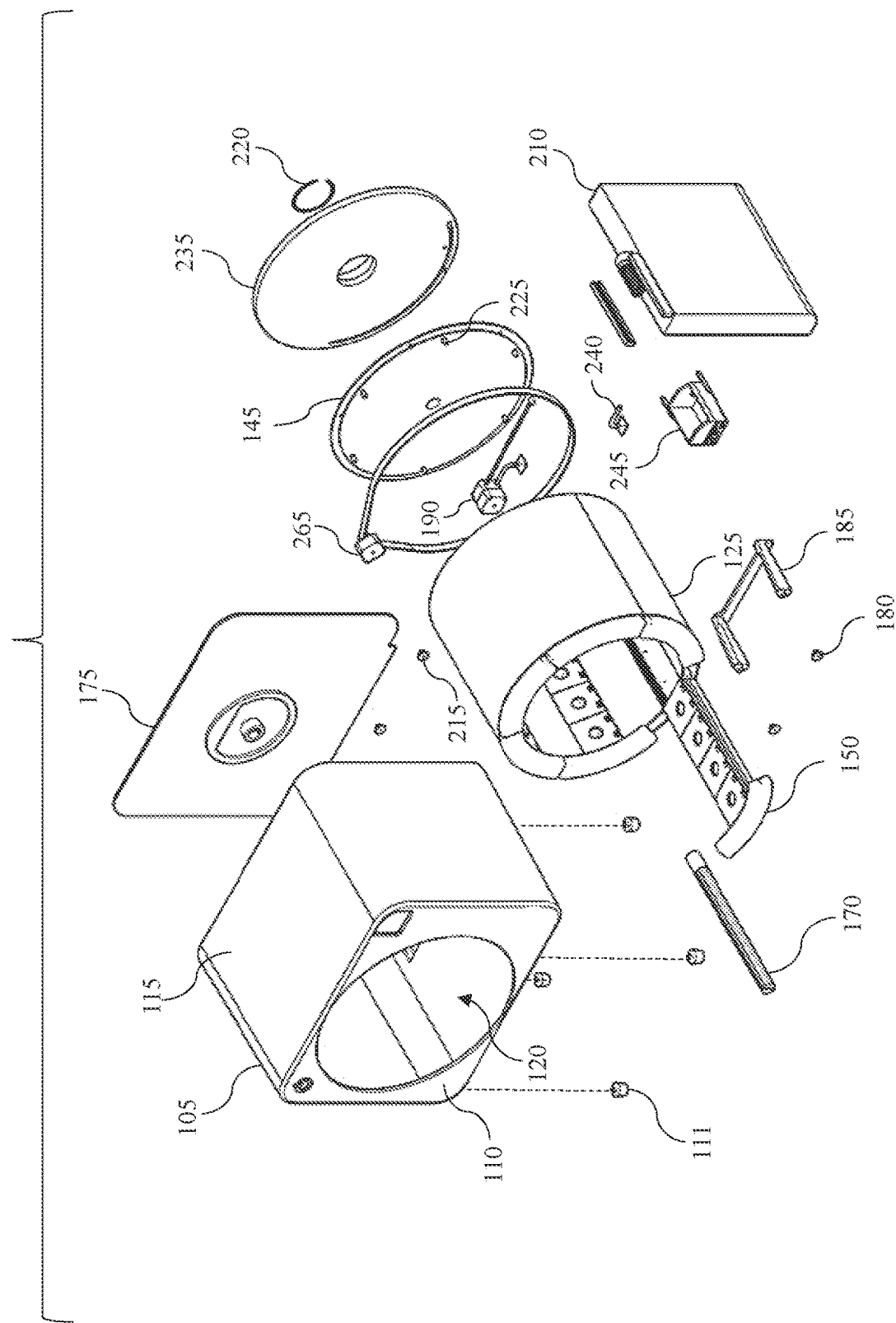
FIG. 2 is an exploded view of an indoor gardening household appliance system, according to an example embodiment.

FIG. 2 is an exploded view of an apparatus, method, and system for providing an indoor gardening, household appliance. The example embodiment shown includes a housing 105, a bearing support backplate 175, a rotatable tubular shaped wall 125, and a plurality of plant grow drawers 150. The housing 105, includes a front side 110 and a plurality of enclosed sides 115. The housing may generally be defined as the outermost structure or casing that encloses and protects internal components or objects. More specifically, the housing may be described as having a front side including an opening 120 and a plurality of other sides forming an enclosed area within. In addition to functionality, the housing may also be designed to have a certain aesthetic appealing to the consumer. In the example embodiment shown in FIG. 2, the housing 105 is shaped similar to a cube with rounded edges and pads or leveling feet 111. The texture and material appear smooth and sleek creating a minimalistic aesthetic. In other embodiments, the housing may be more rugged using different textures or shapes while still fulfilling the functional purpose of protecting or enclosing the components or items within. The housing may also include an internal frame structure. The housing improves over the prior art by providing an enclosed system. The enclosed system allows the system to control the growing conditions for the plants for optimal and efficient growing processes.

In some embodiments, the material used on the housing may be magnetic similar to other kitchen appliances such as stainless steel or iron allowing the user to magnetically attach or hang items on the outer side of the housing. The housing may be comprised of metallic materials such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™ or other materials having waterproof type properties. The housing may be formed from a single piece or from several individual pieces joined or coupled together. The components of the housing may be manufactured from a variety of different processes including an extrusion process, a mold, casting, welding, shearing, punching, folding, 3D printing, CNC machining, etc. However, other types of processes and materials may also be used and are within the spirit and scope of the present invention.

The opening 120 on the front side of the housing may be described as the gap or space present on the housing that provides access to the interior of the indoor gardening household appliance. In the example embodiment shown by FIG. 1 and FIG. 2, the opening is circular having a diameter span the height of the housing. In other embodiments, the opening may be smaller or narrower. For example, in another embodiment the user may only want an opening the size of a single drawer. In another example embodiment, the user may want the opening to be covered with a material such as glass creating a door to the interior of the device. A transparent door allows the user to be able to see within the device without having direct access. This may be useful for protective purposes or preventative purposes if the user has a small child or pet likely to reach into the device.

The rotatable tubular shaped wall 125, also referred to as drum, is disposed inside the housing and is concentric with the opening 120. The rotatable tubular shaped wall is also shown and described in FIGS. 2-5. The rotatable tubular shaped wall includes an inner surface 130, an interior compartment 135, and a back side 140. The rotatable tubular shaped wall may be generally defined as a hollow cylindrical structure resembling a tube or pipe able to rotate or turn around an axis or pivot point. More specifically, the drum is defined as having an inner surface, an interior compartment, and a back side sharing the same center as the opening on the housing.

The interior compartment 135 of the rotatable tubular shaped wall may be accessed through the opening on the front side of the housing. The interior compartment provides space for plants and produce to grow outwards from the seed compartment towards the center of the drum. The interior compartment of the tubular shaped wall refers to the designated space within the hollow area of the wall. It is a distinct area enclosed by the inner surface of the tubular structure and is specifically designed to provide storage or functional capabilities. The interior compartment may vary in shape, size, and configuration depending on the intended application and design considerations. It can include features such as shelves, drawers, partitions, or other storage elements to facilitate organization and maximize the utilization of available space as described herein. Additionally, optional features like lighting, ventilation systems, or power outlets may be incorporated into the interior compartment to enhance its functionality and convenience as further described herein.

The rotatable, tubular-shaped wall of the indoor gardening, household appliance system is concentric with the opening. In the context of this invention, "concentric" refers to the geometric relationship where the centerlines of the tubular-shaped wall and the opening share the same center point. This means that the tubular-shaped wall is symmetrically positioned around the central axis of the opening, ensuring that the wall is uniformly distributed and balanced around the opening. The concentric configuration allows for smooth and stable rotation of the wall within the opening, minimizing any wobbling or uneven movement during operation.

The inner surface 130 of the tubular shaped wall is a continuous, curved surface that encompasses the interior space of the wall. It forms the boundary between the interior compartment and the hollow area within the tubular structure. The inner surface is typically smooth and continuous, providing a seamless and aesthetically pleasing appearance. It may be constructed using various materials such as metals, polymers, or composites, depending on the desired structural properties and design requirements of the rotatable tubular wall.

As mentioned above, this method of farming helps improve upon the prior art by reducing the amount of space required as such in traditional planar farming. In the example embodiments of FIG. 3 and FIG. 4, the interior compartment includes drawers 150, growing compartments, lids 206, a central grow light 170, and spacers 375. The back side 140 is in attachment with a grow light 170 located within the interior compartment connecting to the center of the backside extending outward towards the opening of the housing. The back side also functions to form a barrier between the interior of the device and the outside environment. The inner surface 130 of the rotatable tubular shaped wall may be defined as the innermost portion of the drum. The example embodiment of FIG. 5 shows the inner surface of the drum clearly as a grow drawer is removed. The inner surface may be made from smooth materials such that the drawers and spacers may easily slide in and out of the drum. In other embodiments, the inner surface may include fasteners or materials such as magnets to ensure stability of the drawer while in rotation.

Shown by the example embodiment of FIG. 2, the rotatable tubular shaped wall is supported by a plurality of rollers 180 and a roller carriage 185 that aides in the ease of rotation. The rollers may be generally defined as devices or components used to facilitate the movement or rotation of objects with reduced friction. More specifically, the rollers may be described as smooth and cylindrical objects that are typically made from strong materials with high load bearing properties in order to provide uniform and smooth rotation of the drum. However, in other embodiments the rollers may be described or may appear differently, and such embodiments are within the spirit and scope of the disclosure. The exploded view of FIG. 2 further illustrates the drawers 150 within the rotatable tubular shaped wall. Each drawer is supplied with water and nutrients through a pressurized water system including a water pump 190, a water supply tank 210, a backplate 145 which has water feed nozzles 225 fixed at each drawer location, and a water manifold plate 235 that dictates the water filling and draining timing.

The water supply tank may be generally defined as a container used to store and hold water. In this specific embodiment, the water supply tank is sized to fit in the housing of the system concealing all components, whereas in other embodiments the water supply tank may be outside the housing. In some embodiments the water supply tank may include an opening such as a screw cap or water fill drawer 245 allowing a user to manually fill the tank, whereas in other embodiments, the water supply tank may be disposable when empty requiring a full new tank next. The water supply tank may include a sensor such as gauge or level indicator in connection with a processor such that the water level may be monitored from a display or light indicator. Common materials used when manufacturing water tanks include plastic, steel, and fiberglass, however other materials may also be used.

The water pump may generally be defined as a device used to transport or circulate water from one location to another. More specifically, the disclosed water pump provides water to each drawer as needed. The amount of water and the frequency of water needed of determined by several factors including plant types, stage of growth, temperature, humidity, etc. In some embodiments the pump may be in communication with sensors or timers to determine when to turn on and when to stop. For example, crops such as lettuce and spinach require a significant amount of water due to their water-intensive nature. Common indicators that such plants need more water include yellowing leaves, dry or cracked soil, leaf curling, or stunted growth. Therefore, as sensors pick up and analyze these factors, the pump may be programmed to turn on and add to those specific drawers in need.

The water feed nozzles 225 may also be programmed to narrow or widen due to their drawers needs. For example, if a drawer containing lettuce is indicating to the sensors that more water is needed, the pump may turn on and the water feed nozzle for that specific drawer may widen allowing more water to flow while other drawer's nozzles may narrow promoting water to flow through the backplate towards the largest nozzle. Once the sensors determine that the need is met, the water pump may turn off.

The rotatable tubular shaped wall 125 and backplate 145 may be fixed together and bearing supported into the water manifold plate which may be locked in place with a retaining clip 220. This ensures that minimal force is required to rotate the inner section by the drive belt and motor components. As the water is absorbed and evaporated by the plants, fresh water may be allowed to enter a sump section in the housing 105 by means of a foot valve 240 from the water supply tank 210. As the water level drops in the tank, new water and nutrients may be added through the water fill drawer 245 located in the upper corner of the housing according to the example embodiment. This gravity fed water system may be sealed in the appliance to prevent any spillage. The sump area may be positioned lower that the rest of the inner workings to prevent any contamination of the drive system 265 or electronics.

The housing may be elevated off of the surface by pads or leveling feet 111 to allow clearance and provide noise and vibration isolation as shown in FIG. 1 and FIG. 2. Adjustable leveling feet may also be useful for spaces or countertops that are slanted or uneven such that the user may adjust each foot to the necessary height to ensure that the appliance is level and may perform its functions accurately. In other embodiments, the system may not include pads or leveling feet.

As the drawers 150 rotate with the rotatable tubular shaped wall 125, the plants revolve around a grow light 170 containing an LED strip and located central to the axis of rotation 400. The grow light may be defined as an artificial light source designed to provide the necessary light spectrum for plant photosynthesis and growth. While natural sunlight provides a full spectrum of light, including all colors or the rainbow, grow lights focus on specific wavelengths that are most beneficial for plants during different stages of growth. The disclosed grow light contains an LED strip central to the axis of rotation such that the light emitted may reach each drawer evenly. Similarly, to the water system, the grow light may be in communication with the processor of the indoor gardening, household appliance system. The amount of light needed may vary across the plurality of drawers. In some embodiments, the grow light may be cylindrical having LED strips line the curved lateral surface such that all drawers are exposed simultaneously. In other embodiments, the grow light may have a single LED strip rotate about the axis such that each grow drawer is periodically exposed to the light.

The term "emit" or "emitting" in the context of this paragraph refers to the act of producing or radiating light from a source. In particular, it pertains to the light generated by the grow light within the indoor gardening, household appliance system. The grow light is designed to emit a specific spectrum of light wavelengths that are essential for plant photosynthesis and growth. By emitting light in the desired wavelength range, the grow light provides the necessary energy for plants to carry out their metabolic processes effectively. In the described embodiment, the grow light contains an LED strip centrally positioned along the axis of rotation, allowing the emitted light to reach each drawer uniformly. The emission of light from the grow light can be controlled and coordinated with the rotation of the drawers to ensure that all plants receive adequate illumination for their growth requirements.

The backplate 145 is in attachment with the back side 140 of the rotatable tubular shaped wall 125. The backplate, as shown in FIG. 2, acts as a water feed system and drainage system. In some example embodiments, the back plate may be a singular plate supplying a water channel and drainage outlet for each drawer. In other embodiments the back plate may further include a water manifold plate 235 as described below.

Figure 3:
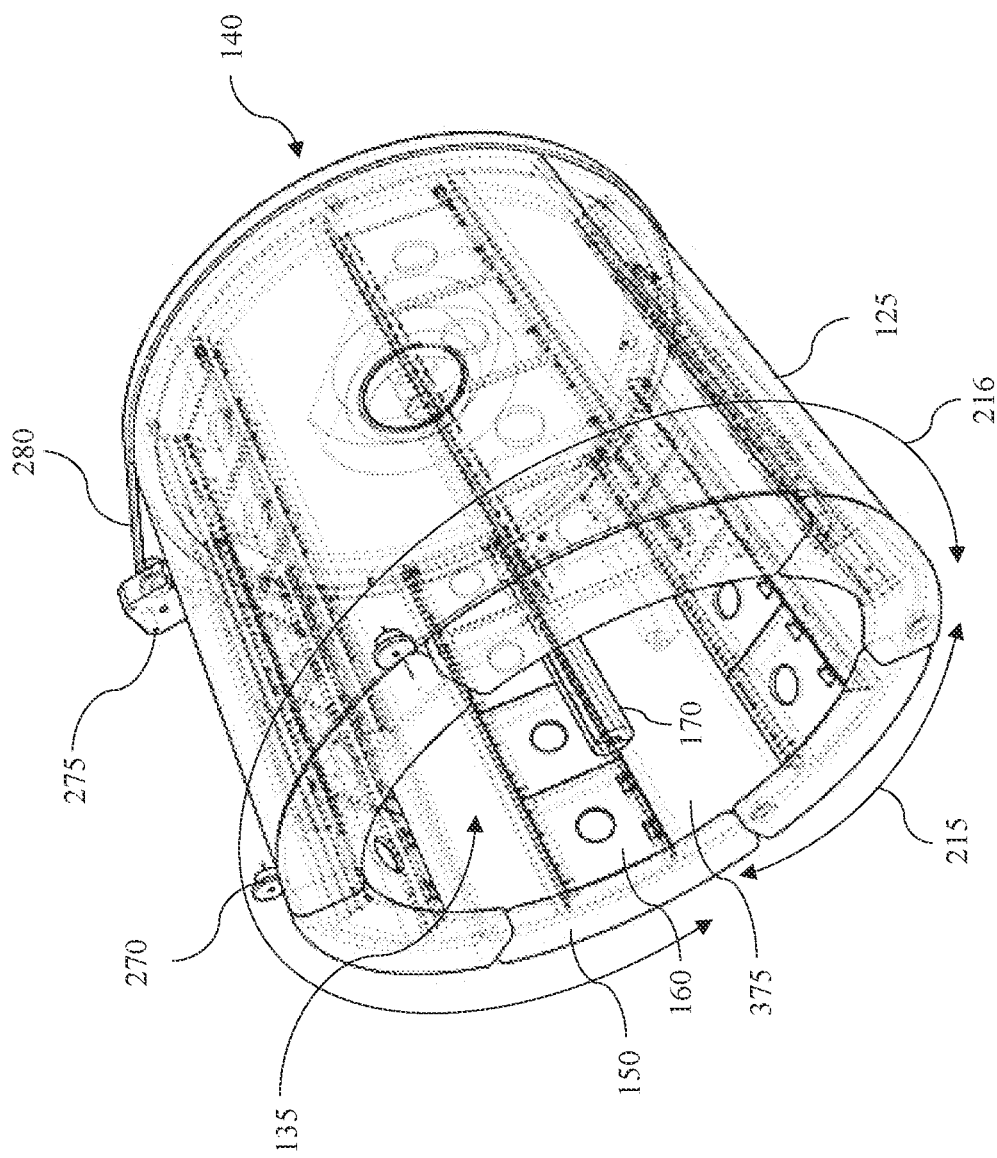
FIG. 3 is a perspective view of a rotatable tubular shaped wall incasing a plurality of drawers, according to an example embodiment.

FIG. 3 is a perspective view of a rotatable tubular shaped wall incasing a plurality of drawers, according to an example embodiment. FIG. 3 shows the main rotating assembly with six drawers 150 located and supported by the upper rollers 270 and drive assembly motor 275 and drive belt 280. Each of the six drawers 150 has four growing compartments with lids 206 that rotate around the central grow light. Each of these lids has a central opening 165 or central hole in the center for the plant to grow through that contains and maintains position of the grow media, seeds, and plants. As the rotating assembly revolves the plants are supported by the lids 206 through all variations of gravitational force. The drive belt 280 may be generally described as a flexible looped component used to transfer rotational motion and power between rotating shafts. The drive belt may be made from rubber or synthetic materials such as neoprene or polyurethane and may be designed to be flexible, durable, and capable of transmitting high amounts of power efficiently. In the present embodiment, the drive belt is arranged around a drive pulley which is arranged around the rotatable tubular shaped wall 125. In other embodiments, the drive belt system may be arranged around multiple pulleys. The specific configuration of pulleys and the drive belt may vary across other example embodiments dependent on the application and desired power transmission requirements.

Figure 4:
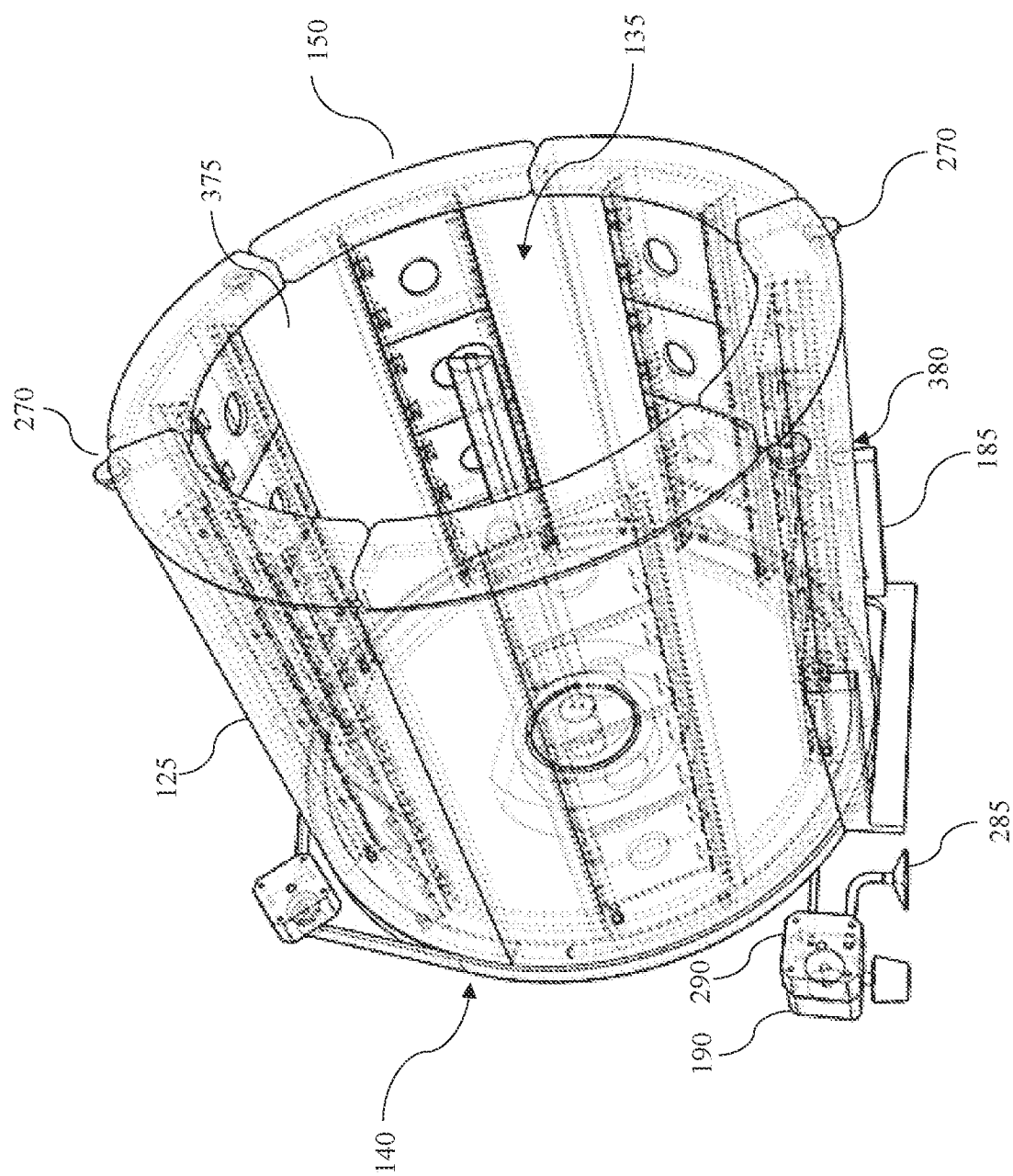
FIG. 4 is a perspective view of the rotatable tubular shaped wall including a water pump, motor, and filter screen, according to an example embodiment.
Figure 5:
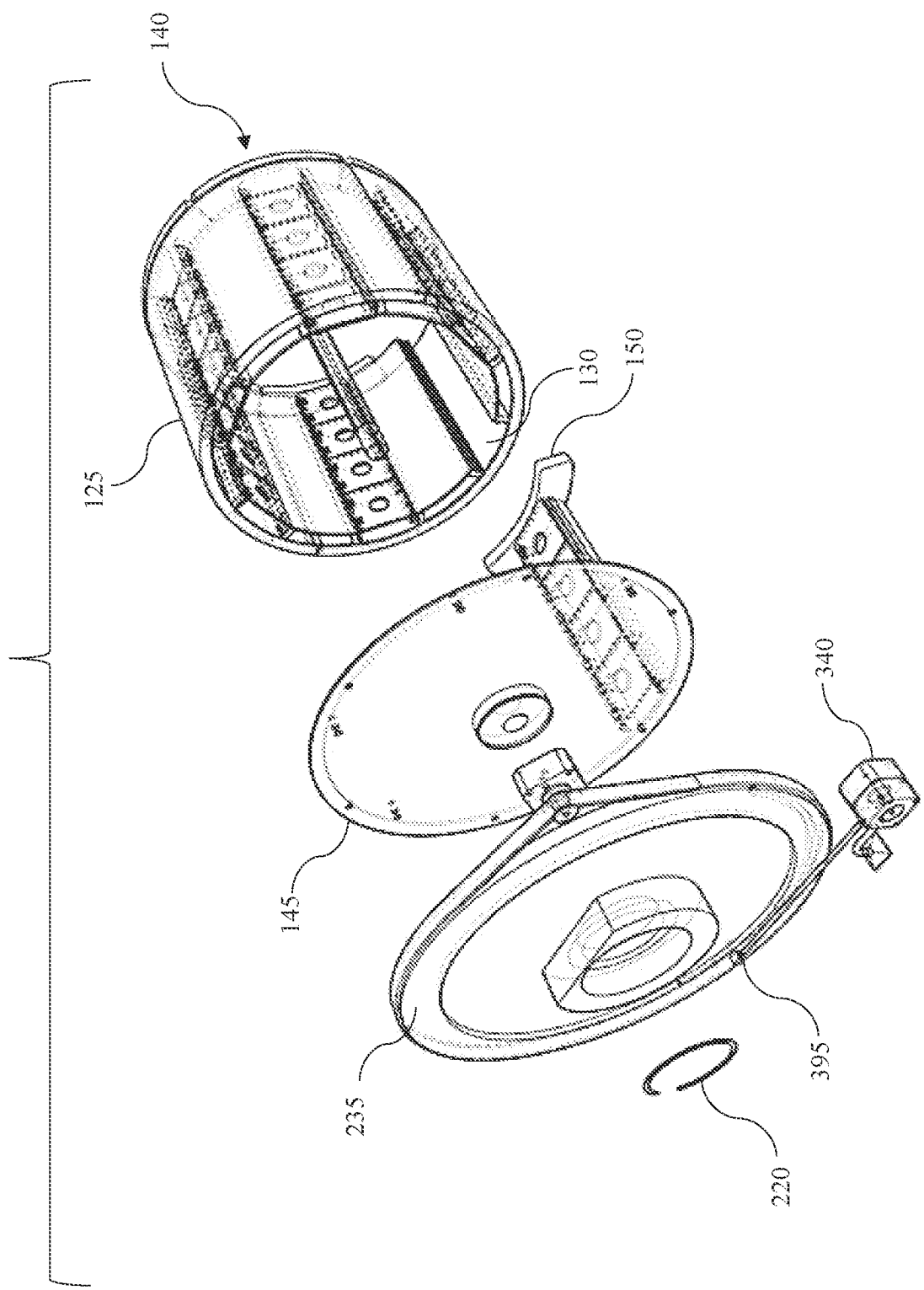
FIG. 5 is a partially exploded view of the rotatable tubular shaped wall including a drive system, watering system, and drawer-to-manifold plate connection, according to an example embodiment.

FIG. 4 is a perspective view of the rotatable tubular shaped wall including a water pump 190, a water pump motor 290, and filter screen 285, according to an example embodiment. FIG. 4 shows the rotating assembly supported by and located by the front rollers 270 and the roller carriage 185 with additional rollers 380. This diagram also shows the water pressure system which includes a water pump motor 290 which powers a water pump 190 and a water pickup foot valve and filter screen 285. The water pickup foot valve and filter screen are submerged under water in the sump section of the outer housing to allow for proper suction feed to the water pump. The system further comprises at least one spacer 375 affixed to the inner surface of the rotatable tubular shaped wall and disposed between adjacent grow drawers of the plurality of grow drawers. In the context of this invention, the term "adjacent" refers to objects, components, or elements that are positioned next to or in close proximity to each other, without any significant separation or intervening space. Adjacency implies a direct spatial relationship, where the objects are contiguous or immediately adjoining, allowing for easy interaction, communication, or transfer of properties or signals between them. The concept of adjacency denotes a physical proximity or nearness, suggesting that the objects or elements are situated side by side or in close alignment. The term "adjacent" encompasses the idea of immediate contiguity and implies that the objects or components are within a relevant distance to facilitate their intended functionality or connection. It should be understood that "adjacent" does not require physical contact or overlapping, but rather signifies a close spatial relationship that enables efficient interaction, communication, or integration between the adjacent entities. As shown in the example embodiment of FIG. 4, the spacer has a width similar to the grow drawers, however in other embodiments the spacers may be narrower or wider depending on the preference of the user of the number of grow drawers.

In the described embodiment, the spacer is affixed to the inner surface of the rotatable tubular shaped wall and is positioned between adjacent grow drawers of the plurality. The term "affixed" refers to the act of securely attaching or fastening the spacer to the inner surface, ensuring that it remains in a fixed and stable position during the operation of the system. The affixing of the spacer may involve various methods, such as adhesive bonding, mechanical fastening, or any other suitable means that provide a reliable and robust attachment. By affixing the spacer, it creates a defined separation between the adjacent grow drawers, maintaining a consistent and predetermined spacing to facilitate their individual functionality and optimize plant growth. The spacer's width is designed to be similar to that of the grow drawers in the example embodiment of FIG. 4. However, it should be understood that in other embodiments, the spacers may vary in width based on user preference or the desired number of grow drawers. The affixed spacer plays a crucial role in ensuring proper alignment, organization, and smooth rotation of the grow drawers within the system, allowing for efficient plant cultivation and maximizing the utilization of available space.

FIG. 5 is a partially exploded view of the rotatable tubular shaped wall including a drive system, watering system, and drawer-to-manifold plate connection, according to an example embodiment. FIG. 5 includes the rotatable tubular shaped wall 125, the backplate 145, the water manifold plate 235, and a single drawer 150 in its normal operation location pressed against the backplate. This allows for sealing of the inlet water pressure nozzle and the outlet drain from the drawer back to the back plate face. Also shown is the water manifold plate with a water pump assembly 340 attached with a tube and water fitting 395 that provides, during a particular point of rotation, water to pass through to the back plate, which is held in place against the manifold back plate using a retaining clip 220.

The grow drawers of the indoor gardening system may include an inlet and/or a conduit in fluid communication with a drain on the backplate. The term "inlet" refers to an opening or passage through which a substance, such as water, is introduced into the grow drawer. The inlet serves as the entry point for the water supply, allowing it to flow into the drawer for irrigation and hydration purposes.

Similarly, the term "conduit" pertains to a channel or tube that facilitates the transfer of fluid. In this case, the conduit connects the drain on the backplate with the grow drawer, establishing a pathway for the drainage of excess water from the drawer. This conduit ensures that any surplus water in the drawer can freely flow out through the designated drain feature and be directed back to the backplate.

By incorporating an inlet and a conduit in the grow drawers, the system enables efficient and controlled water distribution and drainage within the gardening apparatus. The inlet ensures the proper supply of water to the plants, while the conduit ensures the effective removal of excess water, preventing overwatering and maintaining optimal moisture levels for plant growth.

Figure 6:
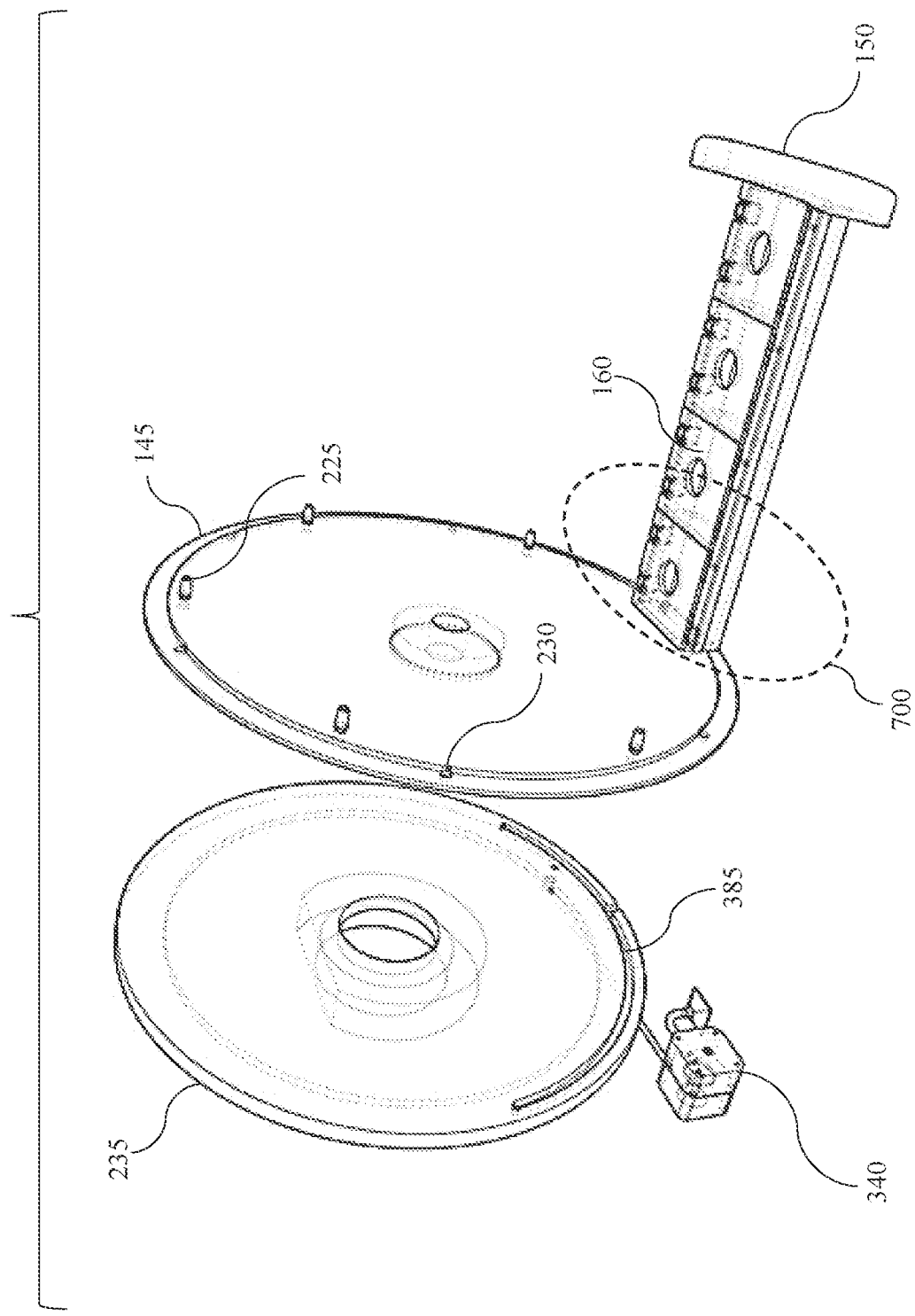
FIG. 6 is an exploded view of the watering system as it applies to the rotating tubular shaped wall and drawers, according to an example embodiment.

FIG. 6 is an exploded view of the watering system as it applies to the rotating tubular shaped wall and drawers, according to an example embodiment. FIG. 6 includes a drawer 150 with four compartment lids 206 connected to backplate 145. The back plate has six water feed nozzles 225 and six drainage outlets 230 located within. As the main rotating assembly rotates, the water manifold plate 235 is stationary and the water drain holes in back plate allow water to drain through the water drain channel 385 located in the water manifold back plate for a predetermined position of the drum rotation. As the rotating assembly reaches a predetermined position against the manifold backplate, water from the water pump assembly is pressurized and delivered through the water feed nozzles into each drawer and internally divided into each compartment.

Figure 7:
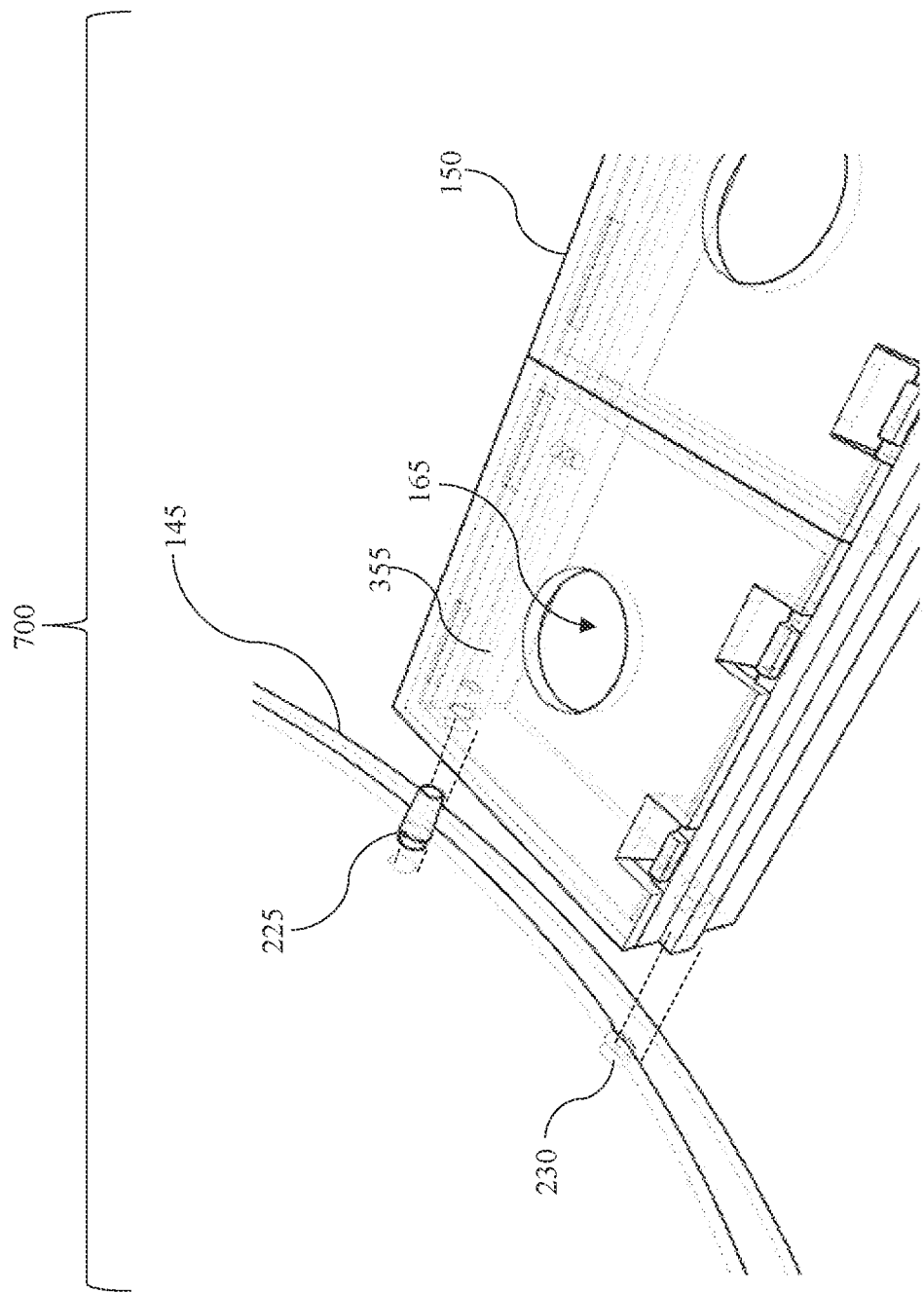
FIG. 7 is a detail view of section 700 referred to in FIG. 6, including the drawer to manifold fittings, the drawer to manifold plate water drain feature, and typical drawer plant and root section cover, according to an example embodiment.

FIG. 7 is a detailed view of section 700 referred to in FIG. 6, including the drawer to manifold fittings, the drawer to manifold plate water drain feature, and typical drawer plant and root section cover, according to an example embodiment. FIG. 7 includes the backplate 145 and the drawer 150 separated for clarity. Located in the back plate is the water pressure nozzle 225 and the drainage outlet 230. Located in the drawer is a water manifold which divides the water equally to each compartment through a back orifice 355. Each compartment has a lid 206 with a central opening 165 to allow for the plant to grow equally spaced in the drawer 150. FIG. 7 depicts a water feed nozzle 225 as well as the drainage outlet 230 located within the backplate. This back plate has six water pressure fill nozzles and six drain holes located in it. As the main rotating assembly rotates, the manifold back plate is stationary while the water drain holes in the back plate allow water to drain through the water drain channel located in the water manifold back plate for a predetermined amount of the drum rotation. As the rotating assembly reaches a predetermined position against the manifold backplate, water from the water pump assembly 340 is pressurized and delivered through the water nozzles into each drawer 150 and internally divided into each compartment.

In some embodiments, the lids may be formed from two individual pieces allowing the user to detach a portion of the lids exposing the grow medium and roots within the drawer. The lids on the grow drawers may be removably attached, allowing easy access to the plants within the compartments. Alternatively, the lids can be hingedly attached, enabling convenient opening and closing of the compartments.

In certain embodiments, each drawer within the system includes at least one lid to effectively retain the plant within its designated compartment. This lid ensures that the plant remains securely positioned during the rotation of the drum assembly and prevents any unintended movement or spillage.

In other embodiments where the grow drawers are divided into multiple compartments using dividers, the system incorporates a plurality of lids to correspond with each compartment. This arrangement allows for individualized control and management of plants within each section, facilitating separate care and cultivation as desired.

The inclusion of various lid configurations, whether removably attached or hingedly attached, ensures flexibility and ease of use in accessing and retaining the plants within the grow drawers. Additionally, the provision of multiple lids in embodiments with divided compartments allows for independent handling and care of plants within each section. Each divided compartment may further correspond to independent watering, nutrient, and maintenance care by the system for efficiently growing a plant species disposed therein. These different embodiments of the lids contribute to the versatility and adaptability of the indoor gardening system, accommodating different user preferences and plant care requirements.

Figure 8:
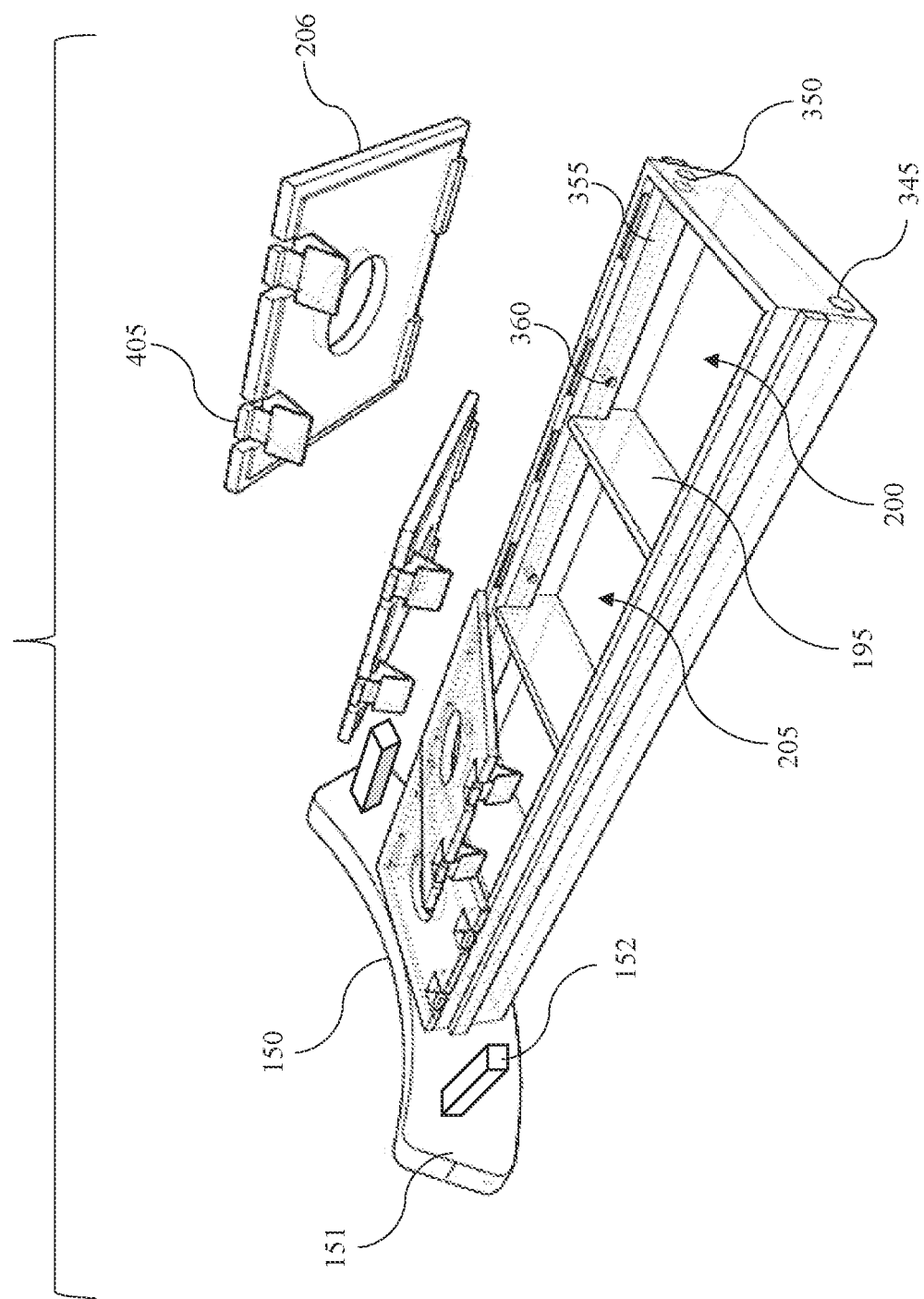
FIG. 8 is a perspective view of a drawer having plant root section lids, a water distribution system internal to the drawer, and a built in drainage system, according to an example embodiment.

FIG. 8 is a perspective view of a drawer having plant root section lids, a water distribution system internal to the drawer, and a built-in drainage system, according to an example embodiment. FIG. 8 includes a drawer 150 showing the lids 206 in various removal positions. Each lid is held in place by tab-like fasteners 405 to support the weight of each plant and growing substrate in all positions of rotation. Inside each drawer 150 are four compartments each of which has its own water supply orifice 360 through the water supply manifold. The water supply manifold is fed water from the water manifold back plate through the drawer inlet 350. As the water is filled into the drawer and the grow media absorbs the water, any excess water in each compartment will freely drain through each compartment's drainage feature. As the rotating assembly continues to spin, any excess water is then drained through the drawer drain hole conduit 345 through the backplate.

The system may include a first rate of rotation based on the first hydroponic grow medium within a first grow drawer of the plurality of grow drawers. In one example embodiment, the rate of rotation of the drum assembly, encompassing the rotatable tubular shaped body, may depend on the characteristics of the grow medium in which the plants are disposed. The grow medium refers to the material or substrate in which the plants are cultivated, providing support, nutrients, and moisture for their growth. In the context of grow media, "hydroponic" refers to a method of cultivating plants in a soilless environment where the plant roots are exposed to a nutrient-rich water solution. Hydroponic systems utilize different types of inert materials or mediums, such as perlite, vermiculite, rockwool, coco coir, or clay pellets, to support the plant roots and provide stability. These mediums do not contain soil but are designed to hold moisture, nutrients, and oxygen, allowing for direct absorption by the roots. By adopting hydroponic techniques, plants can efficiently uptake nutrients and water, resulting in accelerated growth, improved nutrient uptake, and reduced water consumption compared to traditional soil-based cultivation methods. The hydroponic approach offers greater control over nutrient levels, pH balance, and environmental conditions, allowing for precise adjustments and optimization of plant growth and development. In other embodiments, the system may utilize soil-based grow media. Soil-based grow medium typically consists of various types of soil, such as loam, clay, sand, or a mixture of these components, which provide a natural substrate for plant roots to anchor, extract nutrients, and access water. Soil-based grow media also contain organic matter, minerals, and microorganisms that contribute to the overall fertility and structure of the soil. This type of grow media provides a physical matrix that retains moisture, allows for proper aeration, and acts as a reservoir for nutrients.

In this embodiment, the system incorporates a mechanism that adjusts the rotation speed of the drum assembly based on the properties of the specific grow medium. The rate of rotation may be optimized to ensure proper moisture distribution, nutrient absorption, and aeration within the grow medium. Different types of grow mediums, such as soil, coco coir, hydroponic substrates, or other proprietary mixtures, may require varying rotation speeds to maintain an ideal growing environment.

The selection and adjustment of the rotation rate can be determined through experimentation, empirical data, or predefined algorithms. Factors considered when determining the rotation rate may include the water-holding capacity of the grow medium, its drainage characteristics, the plant's water uptake rate, and the desired moisture levels for optimal plant growth. By aligning the rotation rate of the drum assembly with the specific requirements of the grow medium, the system ensures efficient nutrient delivery, even moisture distribution, and proper oxygenation within the root zone. This embodiment allows for enhanced control and optimization of the growing conditions, ultimately promoting healthy plant development and maximizing the productivity of the indoor gardening system. It should be understood that the relationship between the rate of rotation and the grow medium described herein is provided by way of example, and other embodiments may incorporate different factors or considerations when determining the rotation speed of the drum assembly based on the specific characteristics of the grow medium.

In one embodiment, the grow drawer is equipped with a divider that separates it into multiple sections, thereby allowing for the cultivation of different plants simultaneously. The divider, which can be a physical barrier or partition within the grow drawer, ensures that each plant has its designated space and prevents the roots, foliage, or other parts of the plants from intertwining or interfering with each other. By maintaining separate sections for different plants, the system enables the customization of growing conditions, such as lighting, nutrient supply, and environmental parameters, for each individual plant or plant group. This feature enhances the flexibility and versatility of the indoor gardening system, accommodating a variety of plant species with distinct needs and growth characteristics. The divider contributes to the efficient utilization of the available space and facilitates the effective management of the overall cultivation process, resulting in optimal plant growth and maximizing the productivity of the system.

The plurality of drawers 150 are movably attached about the inner surface 130 of the rotatable tubular shaped wall. The plurality of drawers may be defined as containers used to organize, store, and house various plants and produce grown within the apparatus. Each grow drawer of the plurality of grow drawers includes at least one divider 195 to separate each grow drawer into at least a first section 200 and a second section 205. Each grow drawer of the plurality of grow drawers also comprises a first hydroponic grow medium. These drawers further include at least one lid 206 in attachment with each grow drawer of the plurality of grow drawers. The lid includes a central opening 165 where each plant will grow through and up towards the grow light 170. Each of the plurality of drawers is in fluid communication with the backplate such that each grow drawer includes an inlet 350, and a conduit 345 in fluid communication with a drainage outlet 230 on the backplate.

In some embodiments, such as FIG. 8, the drawer includes a conduit 345 in fluid communication with a drain and an inlet 350. The water supply is fed from the manifold back plate through the water feed nozzle 225 to the drawer back orifice 355 and into each section of the grow drawer through a water supply orifice 360. As the water is filled into the drawer and the grow media absorbs the water, any excess water in each compartment will freely drain through each compartment's drain feature. As the rotating assembly continues to spin, any excess water is then drained through the drawer drain hole, referred to as conduit 345 through the manifold backplate.

In the context of the system described, "fluid communication" refers to the state or condition in which there is a continuous and unobstructed flow of fluid between different components or elements. It signifies the ability of fluid, such as water in this case, to move freely from one location to another within the system. In the described embodiment, the drawer includes a conduit that facilitates the fluid communication between the drain, inlet, and various sections of the grow drawer. The water supply is delivered through the water feed nozzle and enters each section of the grow drawer via the water supply orifice. As the water is absorbed by the grow media, any excess water within each compartment can freely drain through the drain feature of each compartment. The excess water further flows through the conduit, which is a designated drain path within the system, and ultimately reaches the manifold backplate for proper disposal or recycling. This fluid communication ensures the efficient distribution and management of water within the system, allowing for effective hydration of the plants and the prevention of water accumulation or stagnation.

Figure 9A:
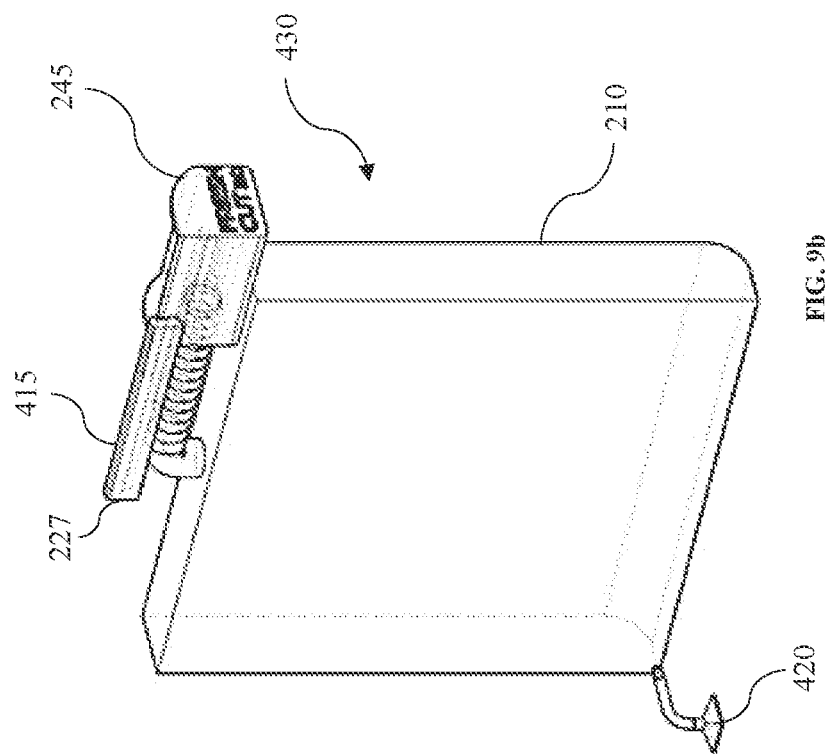
FIG. 9*a* is a perspective view of the water storage bin having a water fill drawer in the closed position, according to an example embodiment.
Figure 9B:
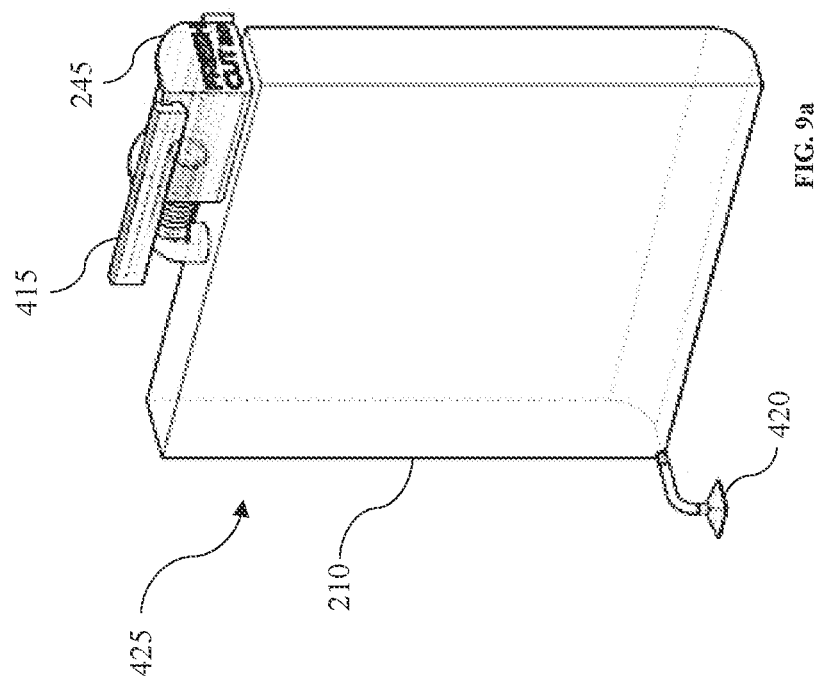
FIG. 9*b* is a perspective view of the water storage bin having a water fill drawer in the open position, according to an example embodiment.
Figure 10B:
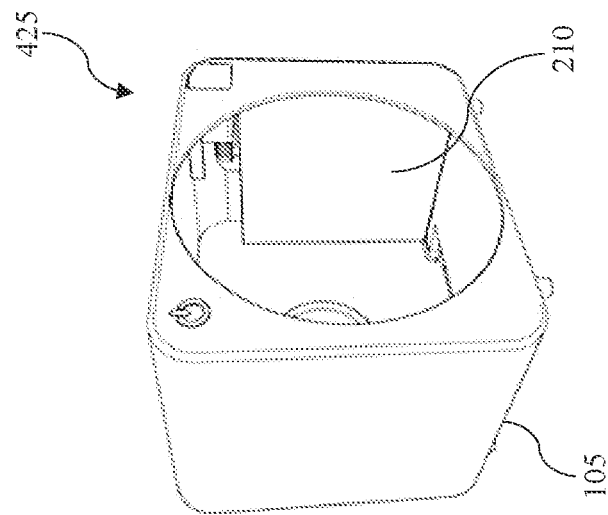
FIG. 10*b* is a perspective view of the main exterior housing including the water storage bin being in a water fill drawer closed position, according to an example embodiment.
Figure 10A:
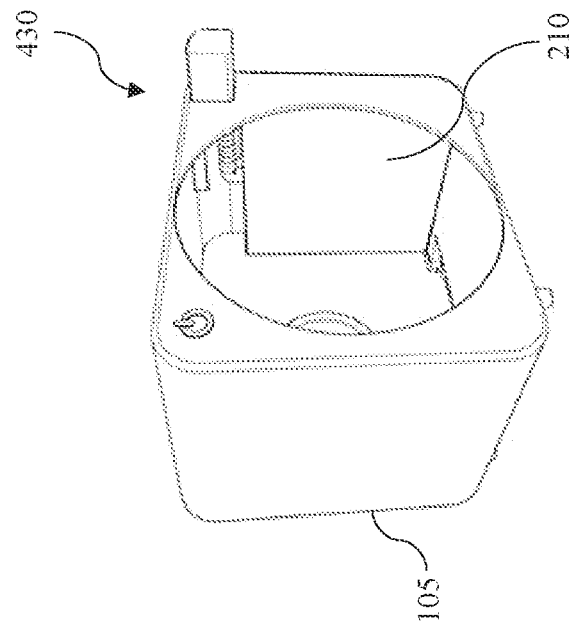
FIG. 10*a* is a perspective view of the main exterior housing including the water storage bin being in a water fill drawer open position, according to an example embodiment.

FIGS. 9a and 9b are perspective views of the water supply tank 210 having a water fill drawer 245 in the closed position 425 and open position 430, according to an example embodiment. The water fill drawer is held in place by linear bearing surfaces 415 to maintain its location in the main housing. An accordion-type tubing fixed to the back of the water fill drawer and aides in ejection of the fill drawer when the end user is required to add water or nutrients to the unit. When the water level in the main housing sump requires water, the foot valve 420 will supply water from the water tank into the sump up to a predetermined level which is controlled by the foot valve. FIGS. 10a and 10b further illustrate the water fill drawer in the open position 430 and the closed position 425 shown in the housing 105.

Figure 11A:
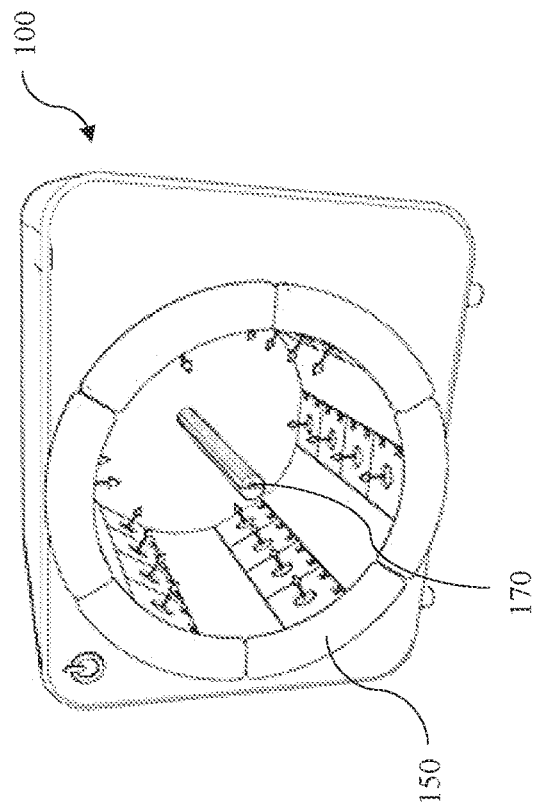
FIG. 11*a* is a perspective view of the indoor gardening household appliance system including plant seeds growing in the plurality of drawers, according to an example embodiment.

FIG. 11a is a perspective view of the indoor gardening household appliance system including plant seeds 300 growing in the plurality of drawers, according to an example embodiment. This embodiment includes the rotating assembly inside of the appliance where seeds are planted in a substrate at each planting hole location. The substrate may be generally defined as any material or medium in which plants are grown in. Substrate provides a foundation for roots to anchor and obtain essential nutrients, water and oxygen. Examples of substrate include soil-based substrate consisting of a mixture of soil and organic matter, and soilless substrate consisting of a mixture of materials like peat moss, coco coir, perlite, vermiculite, etc. The most common substrate or hydroponic grow medium used in rotational vertical farming include rock wool, coco coir, peat moss, pearlite and vermiculite, or expanded clay pebbles. However, in other embodiments, other forms of substrate may also be used and are within the spirit and the scope of the present invention.

Figure 11B:
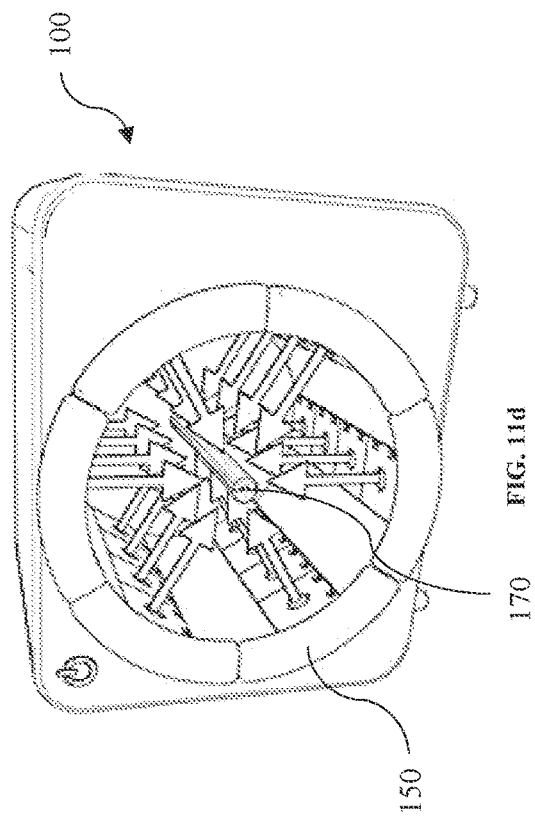
FIG. 11*b* is a perspective view of the indoor gardening household appliance system showing seeds sprouting towards the center grow light in the plurality of drawers, according to an example embodiment.

FIG. 11b is a perspective view of the indoor gardening household appliance system showing the height at which seeds begin sprouting towards the center grow light in the plurality of drawers, according to an example embodiment. This embodiment illustrates each seed now sprouting after many days of rotation, light, and water cycles. Seed sprouting, commonly known as germination, is the initial stage of a plant's life cycle and involves the activation of dormant seed tissues. Seed sprouting is influenced by various factors including temperature, moisture, lights, and the presence of specific germination inhibitors or promoters such as gibberellic acid and microbial inoculants. In some embodiments, the system processor may be preprogrammed to adjust the drawer setting such that it may provide the necessary resources needed at each specific growth stage.

Figure 11C:
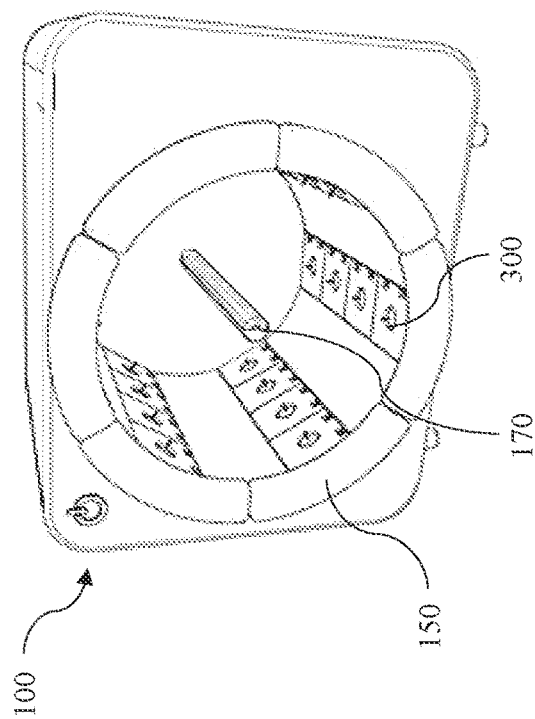
FIG. 11*c* is a perspective view of the indoor gardening household appliance system showing the plants at an intermediate stage of growth in the plurality of drawers, according to an example embodiment.

FIG. 11c is a perspective view of the indoor gardening household appliance system showing the height and direction of the plant growth at an intermediate stage of growth in the plurality of drawers, according to an example embodiment. This embodiment illustrates the plants growing closer toward the center grow light after more rotations of the inner drum and more time passed.

Figure 11D:
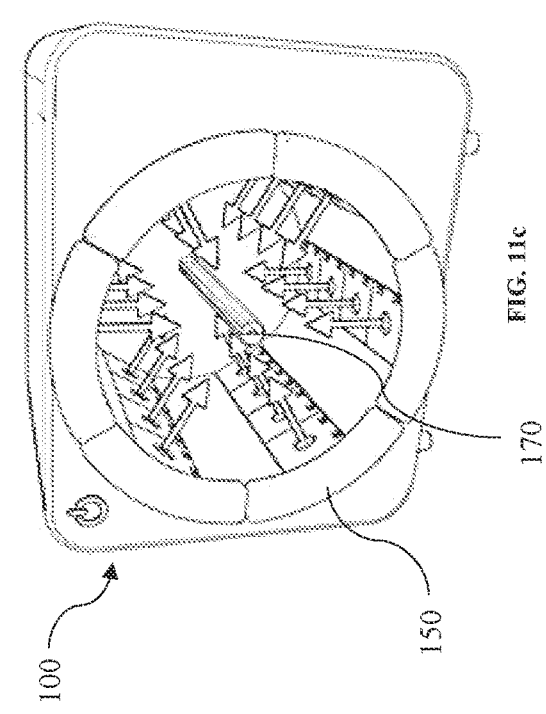
FIG. 11*d* is a perspective view of the indoor gardening household appliance system showing the plants fully grown and ready for harvest in the plurality of drawers, according to an example embodiment.

FIG. 11d is a perspective view of the indoor gardening household appliance system showing the height of the plants fully grown and when ready for harvest in the plurality of drawers, according to an example embodiment. This embodiment shows the plants finally ready to harvest or trim. As plants grow toward the center, they will also help support each other while undergoing the different effects of gravity at various points of rotation. Once the plants are fully grown and ready for harvest, the user may remove the drawer when in unlocked configuration and trim the plant. At the point of harvest, the user may use different methods for harvesting depending on the specific plant being harvested. Common harvesting techniques include handpicking, cutting with sharp tools like knives or shears, pulling or uprooting plants, shaking or stripping the plant to dislodge seeds or fruits, etc.

FIG. 12 is a perspective view of the indoor gardening household appliance system including the central grow light 170 and axis of rotation 400 according to an example embodiment. This example embodiment illustrates the LED grow light assembly plugged into the receptacle at the rear of the housing 105 rear cover and bearing support 440. In operation, after a predetermined amount of time based on the life of the LED light, the assembly will need to be replaced to maintain efficiency. The axis of rotation may be defined as the line around which an object or system rotates. In the present embodiment, the axis of rotation is located at the center of the rotatable tubular shaped wall. Contrarily, the term "rearward" refers to the direction or orientation that is considered backward or facing the rear of the appliance. It is the opposite direction to the "frontward" direction and represents the side or aspect of the appliance that is intended to be less visible or accessible to the user during regular operation or interaction.

FIGS. 13-16 illustrate the rotatable tubular shaped wall 125 having a stop located on a bottommost arc section 215 of the system (as shown in FIG. 3), according to an example embodiment. In some embodiments, the stop may be in the form of a plate disposed frontward relative to a front side of a respective grow drawer. In other embodiments, the stop may be a fastener operatively coupled to a rearward portion of the grow drawer and the backplate. Furthermore, in other embodiments, the stop may be a fastener operatively coupled to a frontward portion of the grow drawer and the housing, the rotatable tubular shaped wall, or a spacer. In the context of this system, the term "frontward" refers to the direction or orientation that is generally considered forward or facing the front of the appliance. It indicates the side or aspect of the appliance that is intended to be more visible or accessible to the user during regular operation or interaction.

The present system includes at least one stop 155 removably engaging with at least one grow drawer of the plurality of grow drawers. The stop retains at least one grow drawer within the interior compartment of the rotatable tubular shaped wall. The stop may retain a portion of the grow drawer or the entire grow drawer within the interior compartment. The stop may be generally defined as a device or system designed to halt or restrict the motion or operation of a particular object.

In one example embodiment, as shown in FIG. 8, the stop may be a plate 151 on the frontside of the grow drawer. The plate is a stop which restricts the movement of the grow drawer. The plate may extend past the bounds of the drawer which houses the plant material such that the plate may extend over the central opening of the housing and/or the adjacent spacer. The stop may further include interlocking element 152 which may be received by a spacer adjacent to the grow drawer. As illustrated, the locking mechanism is on the front faceplate of the grow drawer, behind the drawer face thereby oriented towards the interior of the system. In certain embodiments, the stop of the grow drawer is implemented as an interlocking element at attachment with the grow drawer that is operationally coupled to the spacer. In other embodiments, the interlocking element may be located on the backplate to ensure that the grow drawer is securely in attachment with the back plate of the system. By securing to the backplate, and/or by having a locking mechanism (which may be a sensor) on the backplate, the system can ensure that the grow drawer is properly positioned within the interior compartment. Furthermore, the stopping mechanism may be located on the front face of the enclosure near the inside of each drawer which may interface with a mating locking mechanism on the grow drawer, for example, the locking mechanism may be at or near the opening and disposed such that the face plate of the grow drawer engages the locking mechanism on the enclosure. The location of the mechanism may vary across other example embodiments and is within the spirit and the scope of the present invention. This interlocking element serves as a latch mechanism, enabling the lock and unlock functionality of the grow drawer. The interlocking element, designed as a latch, engages with the spacer to secure the grow drawer within the interior compartment of the housing.

In certain embodiments, the locking mechanism may utilizes a magnet that can be enabled or disabled to secure or release the drawers, respectively. Each drawer within the indoor gardening, household appliance system may be equipped with a magnetic component, such as a metal plate or a ferromagnetic material, that interacts with the magnet and/or such that the magnet on the plate interacts with at least one of the enclosure, backplate, and/or spacer. When the drawer is in its proper position, the magnet is enabled, generating a magnetic field that attracts the magnetic component on the drawer. This magnetic attraction securely locks the drawer in place, preventing unintended opening or dislodgment during the operation of the rotational drum farming machine. The magnet is controlled by the control system of the indoor gardening system, which includes a control board or electronic control unit (ECU). The control board sends signals to enable or disable the magnet based on the proper alignment and closure of the drawers.

When the grow drawer is inserted into the designated position, the interlocking element is engaged, locking the drawer in place. This ensures that the grow drawer remains securely positioned during the rotation of the drum assembly, preventing unintended movement or dislodgement.

In one embodiment, each drawer includes an interlock switch or sensor that detects proper alignment and closure. When a drawer is correctly positioned, the interlock switch is activated, signaling that it is ready to be securely locked. The activated interlock switch may communicate with the control system of the indoor gardening system, specifically a control board or electronic control unit (ECU). This communication triggers the engagement of the locking mechanism, which is specifically designed to accommodate the unique configuration of the drawers and the interior of the rotational drum farming machine. An electrical component, such as a solenoid or motor, may be employed to initiate the locking action. Upon confirmation of proper alignment and closure by the interlock switch, the control board sends a command to the solenoid or motor for activation. Once activated, the solenoid or motor may generate the necessary force to engage the locking mechanism, securely fastening the drawers within the indoor gardening, household appliance system. The specific design of the locking mechanism may involve latches, catches, or other mechanisms that interface with corresponding hooks or locks of the system. Based on the aforementioned embodiments, it is understood that the locking mechanism of the drawer may interface with a corresponding locking mechanism of the system being at least one of the enclosure, at least one space, the backplate, etc. The various configurations of the locking mechanism may depend on the scale of the system. However, the general improvement over the prior art is such that the locking mechanism acts as a stop to prevent each grow drawer from being removed from the interior compartment of the system in operation. Other locking mechanisms and stops may be used such that said locking mechanisms and stops are within the spirit and scope of the present disclosure.

To ensure safe and reliable operation, the indoor gardening system may incorporate additional safety measures, such as sensors that detect the rotational speed, position, or other parameters. These safety mechanisms maintain the locking mechanism's engagement during the operation of the machine, preventing accidental opening or dislodgement of the drawers and ensuring the safety of users and the plants being cultivated.

When desired, the control board and/or at least one processor of the system may send a signal to the solenoid or motor, instructing it to release the locking mechanism. This action disengages the latches, catches, or other mechanisms from the corresponding hooks or locks, enabling easy access to the contents of the drawers for planting, maintenance, or other gardening activities. As further discussed below, the disengagement of the at least one grow drawer may depend on a predetermined positioning of the at least one grow drawer about the drum assembly and/or opening, such as at the bottommost arc segment position for example. The bottommost arc segment position ensures that the at least one grow drawer is substantially upright so that the contents within may not be damaged or displaced during movement into and out of the system.

To unlock the grow drawer, the interlocking element is operated by a user and/or automatically by the system depending on the position of the grow drawer, disengaging it from the spacer. This action allows the grow drawer to be easily pulled out or pushed into the interior compartment as desired, facilitating convenient access for planting, harvesting, or maintenance activities.

The interlocking element, functioning as a latch, provides a reliable and robust mechanism to retain and release the grow drawer within the housing. Its operational coupling with the spacer ensures a secure and stable positioning of the grow drawer during the operation of the indoor gardening system. By incorporating this interlocking latch mechanism, the system offers user-friendly and efficient handling of the grow drawers, enhancing the overall user experience.

In other embodiments, such as shown in FIGS. 13-16, the stop used in the disclosed invention is described as a system including a substantially ring-shaped body 260 that substantially surrounds the plurality of grow drawers, a stop channel 255 on the substantially ring-shaped body, and a tab 250 on the bottom side of each grow drawer 330 of the plurality of grow drawers, such that when the tab is within a stop channel 255, each drawer of the plurality of drawers is prevented from being removed within the interior compartment when in the locked configuration.

Figure 14:
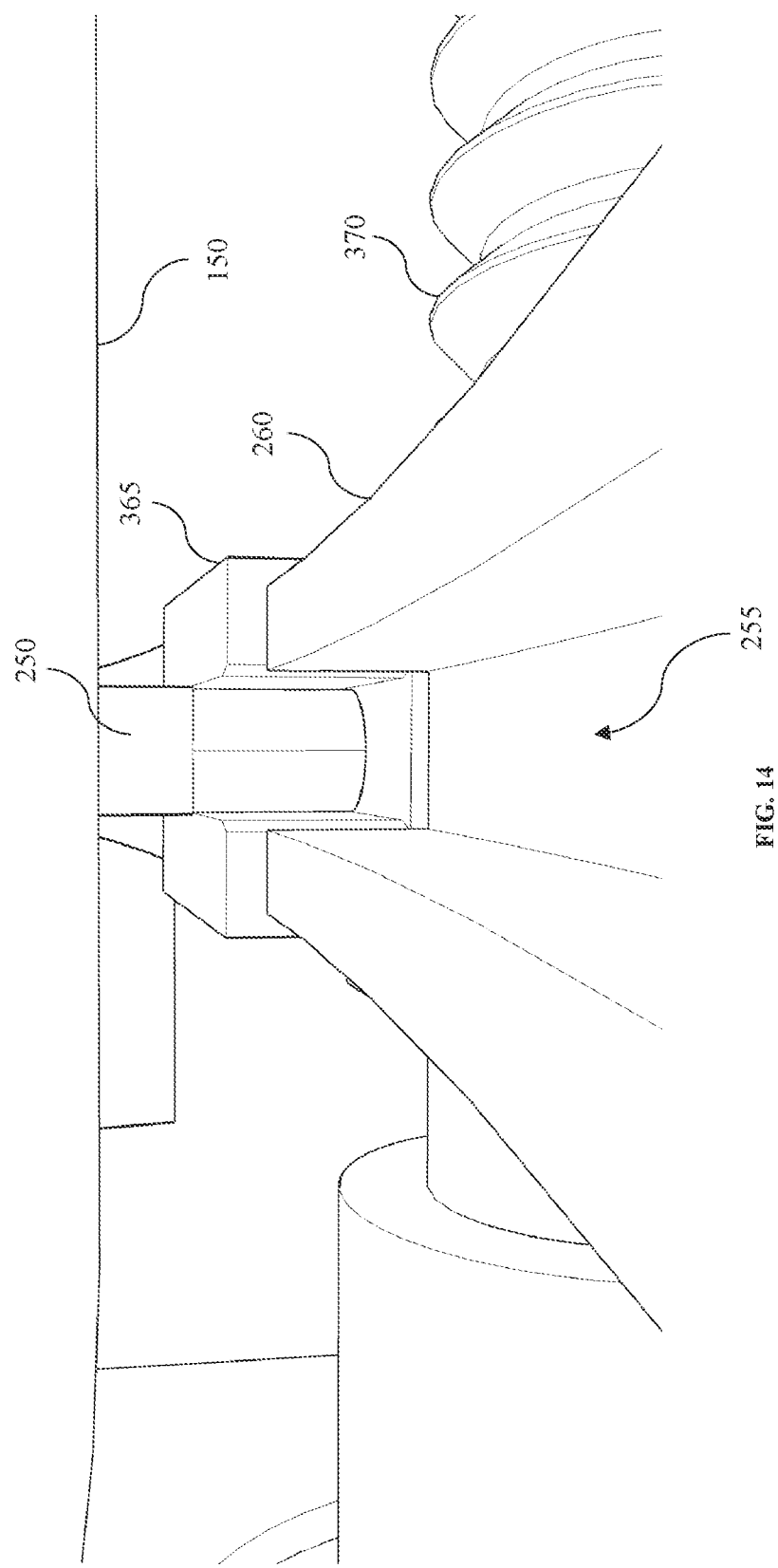
FIG. 14 is a perspective view from within the stop channel of the substantially ring shaped body while in locked configuration, according to an example embodiment.

FIGS. 13 and 14 are example embodiments having the stop consist of a substantially ring-shaped body 260 including a stop channel 255 substantially surrounding the plurality of grow drawers 150 such that each grow drawer may be in contact with the stop channel through use of tabs. Each grow drawer contains a tab 250 located on the bottom side of said drawer 330 such that the tab may extended downwards and be received by the stop channel. is within the stop channel, the drawer may rotate 360 degrees around the tubular shaped body. While the grow drawers tab is contained within the stop channel, the grow drawer is considered to be in a locked configuration. The locked configuration may be defined as when drawers are prevented from being removed outside of the interior compartment.

Figure 15:
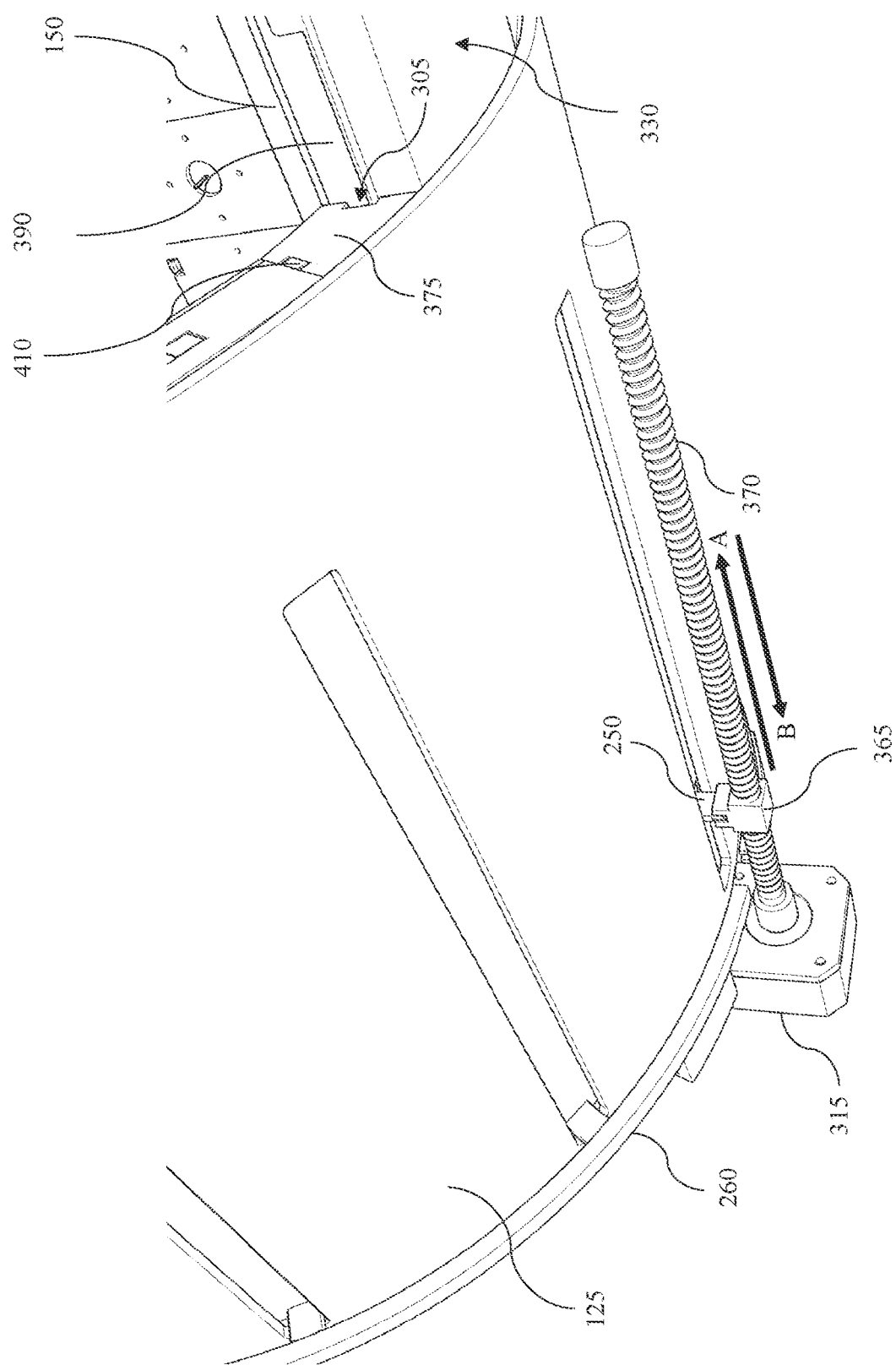
FIG. 15 is a bottom perspective view of the rotatable tubular wall while in unlocked configuration, according to an example embodiment.

The substantially ring-shaped body 260 further comprises a cutout 310 located at a bottommost arc section 215 of the substantially ring-shaped body. FIG. 14 is a perspective view from within the stop channel of the substantially ring-shaped body showing the cutout. At the cutout, the tab is received by a fastener 365 movably attached to a rotatable, threaded rod 370. The fastener and threaded rod function as a lead screw also known as a translation screw creating linear motion from rotary motion. Lead screws consist of a threaded shaft, described as the threaded rod 370 and a matching threaded nut, described as fastener 365. As the shaft rotates, the nut translates along its length. Lead screws can be driven manually or by motor. The example embodiments of FIG. 13 and FIG. 15 show the threaded rod 370 being driven by a motor 315. The motor may be in attachment and communication with the systems processor such that the user may control the motor from the display screen. In some embodiments, the motor may be preprogrammed to automatically turn on when the plants or produce within the system are ready to be harvested according to sensor input and preprogrammed logic. In other embodiments, the user may manually pull on the drawer forcing the tab 250 to engage the fastener 365 forcing the rod to rotate as the fastener moves linearly towards the user.

The term "cutout" refers to a specific area or opening that is intentionally created or formed within the substantially ring-shaped body 260. The cutout 310 is located at the bottommost arc section 215 of the ring-shaped body, and it serves a particular purpose within the described system. It is depicted in FIG. 14, which provides a perspective view from within the stop channel of the ring-shaped body. In this specific location, the cutout allows for the reception and engagement of a tab by a fastener 365 that is movably attached to a rotatable, threaded rod 370. The fastener and threaded rod function as a lead screw or translation screw, converting rotary motion into linear motion. The threaded rod rotates, causing the fastener to translate along its length. The cutout plays a crucial role in facilitating the interaction and movement between the tab, the fastener, and the threaded rod, enabling the desired linear motion and operation of the system.

In other embodiments, the tab may be attached to a drive belt rather than a threaded rod. Furthermore, the stopping mechanism may be in the form of a carriage assembly. For example, if the stopping mechanism is in the form of a drive belt assembly, the drive belt may be securely engaged with a series of pulleys located below the bottommost grow drawer rotating in harmony enabling the transmission of power from the driving source. To promote longevity and minimize friction, the pulleys, tensioner, and idler pulleys may incorporate high-quality bearings facilitating smooth rotation increasing the overall durability of the assembly. This type of assembly may require mounting brackets and additional hardware specifically engineered to provide smooth and secure movement and attachments.

In another example embodiment, the stopping mechanism may be in the form of a carriage assembly such that the bottommost drawer may be linearly translated in and out of the rotating drum through use of a carriage body. An assembly like such may include guide rails, bearing systems, actuation mechanisms, position sensors, motor driven systems, limit switches, damping systems, etc. These stopping mechanisms or systems may be automated and in communication with the systems processor or may be manually operated.

In other embodiments, the stop may be described as a mechanism located on the bottom side of each grow drawer 330 of the plurality of grow drawers. In this example embodiment, the stop is a fastener operatively coupled to a rearward portion of the grow drawer and either the housing, the rotatable tubular shaped wall, or a spacer 375.

The spacer 375 may be defined as a device used to create a distance or gap between two drawers. Spacers can be used to ensure proper alignment, clearance, or functionality in addition to enhancing the aesthetic appearance of the interior compartment of the drum. The plurality of spacers may be affixed to the inner surface of the rotatable tubular shaped wall and disposed between adjacent grow drawers of the plurality of grow drawers. In some embodiments, such as FIG. 3, the spacers may span the same length as the drawers, whereas in other embodiments the spacers may only extend a portion of the drawer length. The width of the spacer may vary dependent on how many drawers are present inside the rotating drum or simply the aesthetic preference of the user. In some embodiments, the spacers may act as storage. For example, a user may store packaged seeds before a user is ready to plant them, or small tools used for trimming. In other embodiments, the spacers may be used for additional stability of the drawer while in rotation. As shown in FIGS. 13 and 15, the spacer further comprises an elongated channel 305 for receiving at least a portion of a first grow drawer 410 or a telescoping rail 390 attached to the spacer and the first grow drawer. The elongated channel may span the length of the spacer or may span a portion of the spacer length.

In certain embodiments, the spacer of the indoor gardening system incorporates an elongated channel or track that serves multiple functions. The primary purpose of this elongated channel is to guide the grow drawer smoothly while sliding within the interior compartment of the system's housing. The spacer includes a structural element that forms the elongated channel, providing a defined pathway for the movement of the grow drawer. This channel ensures proper alignment and controlled motion of the drawer, preventing misalignment or unintended lateral movement during operation.

As illustrated in FIGS. 13 and 15, the spacer is designed to receive at least a portion of a first grow drawer or a telescoping slide that is attached to the spacer and the first grow drawer. The term "at least a portion" refers to the capability of the spacer to accommodate and interact with a substantial part or segment of the grow drawer or telescoping slide. This allows for a secure and stable connection between the spacer and the first grow drawer, ensuring smooth and controlled movement within the interior compartment of the indoor gardening system's housing. The elongated channel incorporated in the spacer serves multiple functions, with its primary purpose being to provide a guiding path for the grow drawer. By sliding along the length of the elongated channel, the grow drawer experiences reduced friction and improved stability, enabling seamless operation and optimal utilization of the available space within the system. The elongated channel may span the entire length of the spacer or only a portion of it, depending on the specific design and requirements of the system.

As depicted in certain embodiments, the grow drawer may be equipped with an extruded rail specifically designed to facilitate smooth sliding into the track or channel of the spacer. The extruded rail serves as a guiding mechanism that complements the elongated channel of the spacer, ensuring precise alignment and effortless movement of the grow drawer within the interior compartment of the indoor gardening system. By incorporating an extruded rail on the drawer, the spacer and the drawer form a compatible sliding interface, allowing for easy installation, removal, and positioning of the grow drawer.

Additionally, the spacer serves as the operational attachment point for the grow drawer within the interior compartment. The grow drawer is designed with corresponding mechanisms or protrusions that fit within the elongated channel of the spacer, allowing for a secure and stable connection. The interaction between the channel and the drawer's attachment elements ensures that the drawer remains aligned and properly positioned within the interior compartment, while also providing a secure operational attachment point.

In other embodiments of the indoor gardening system, the spacer may be designed with a telescoping rail configuration. This telescoping rail 390 is attached to the grow drawer and facilitates the retractable movement of the drawer into and out of the interior compartment of the system. The telescoping rail mechanism consists of nested or overlapping sections that can extend or retract. When the grow drawer is being inserted or withdrawn from the interior compartment, the telescoping rail extends or retracts accordingly, allowing smooth and controlled movement of the drawer. This telescoping action ensures that the drawer remains properly aligned and guided throughout the sliding process.

Furthermore, in certain embodiments, a movable arm assembly is attached to the grow drawer, further enhancing its retractable capability. This movable arm assembly, in conjunction with the telescoping rail 390, provides additional support and stability during the retracting and extending motion of the drawer. The arm assembly may include hinges, slides, pivotable arms, or other mechanisms that enable the controlled movement of the grow drawer.

The combination of the telescoping rail and movable arm assembly enables the grow drawer to retract into and extend out of the interior compartment of the system with ease. This retractable functionality enhances accessibility for planting, harvesting, or maintenance purposes, allowing users to conveniently access the plants within the drawer. The incorporation of the telescoping rail and movable arm assembly in the spacer provides a reliable and efficient retractable mechanism for the grow drawer. This design variation adds versatility to the indoor gardening system, offering enhanced convenience and ease of use in managing the plants within the interior compartment.

The system further includes an unlocked configuration and a locked configuration. The unlocked configuration includes a first grow drawer of the plurality of grow drawers disposed within the bottommost arc section 215 of the opening and is movable into and out of the interior compartment through the opening. The unlocked configured is exemplified by FIG. 15, wherein the bottommost grow drawer 150 is being removed from the interior compartment of the system. The unlocked configuration corresponds to a first grow drawer, specifically positioned within the bottommost arc section of the opening on the front side of the housing. In this state, the first grow drawer is movable into and out of the interior compartment through the opening. By unlocking the first grow drawer, users can easily access the plants within the drawer for activities such as planting, harvesting, or maintenance. The unlocking mechanism may involve disengaging the locking mechanism or releasing the latch that secures the grow drawer in place.

Figure 16:
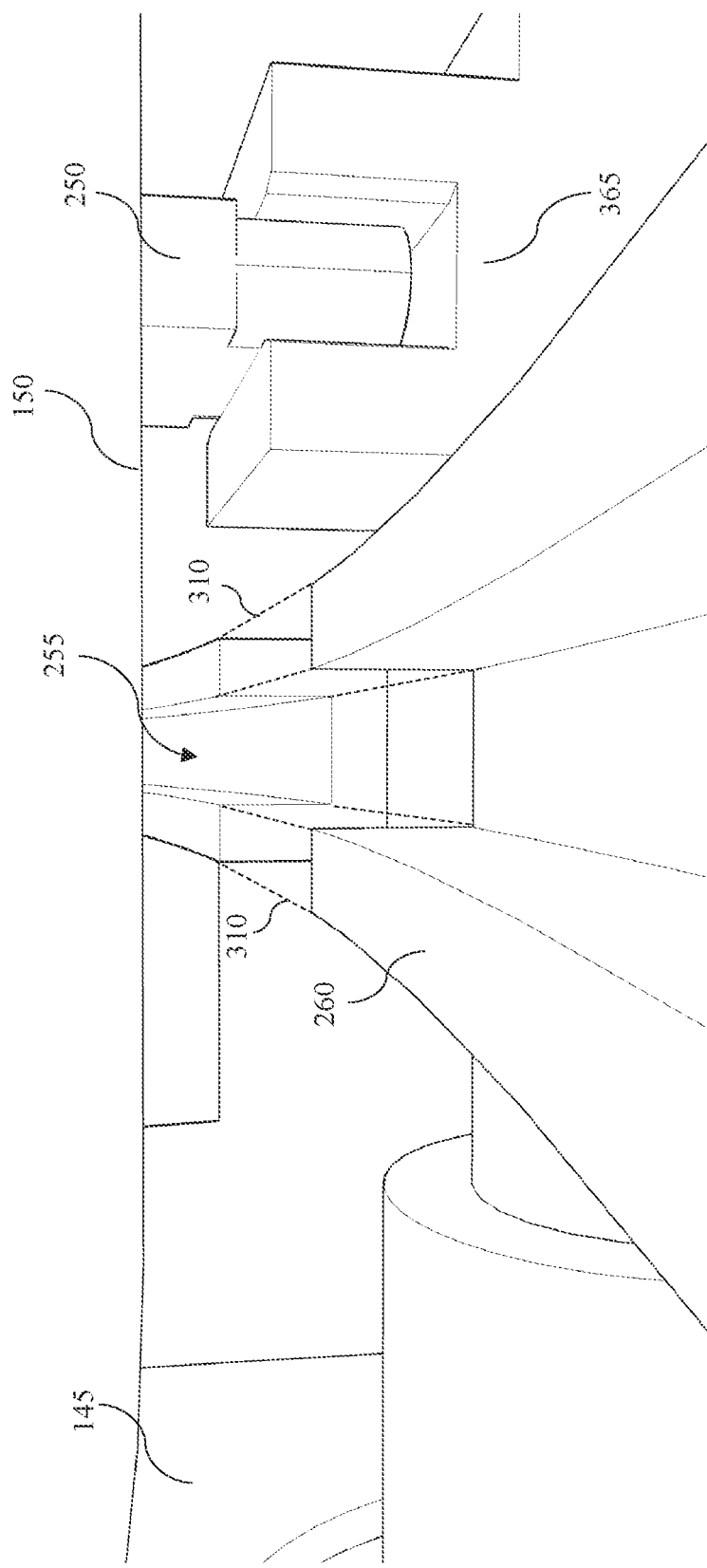
FIG. 16 is a perspective view from within the stop channel of the substantially ring shaped body while in unlocked configuration, according to an example embodiment.

The locked configuration includes a plurality of second grow drawers of the plurality of grow drawers disposed about the top arc section of the opening are prevented from being removed outside of the interior compartment. The top arc section may be defined as the portion of the arc that disposed above the bottommost arc section 215 as shown in FIG. 3. FIG. 1 depicts the system in a locked configuration having all grow drawers maintained within the drum, whereas FIG. 15 and FIG. 16 depicts an unlocked configuration where the grow drawer 150 is partially maintained within the drum having a portion of the drawer outside of the drum. In the locked configuration, a plurality of second grow drawers, belonging to the system's set of grow drawers, are positioned around the top arc section of the opening on the front side of the housing. In this state, the grow drawers are securely retained within the interior compartment of the system, preventing their accidental displacement or movement during operation. The locking mechanism, which may involve the engagement of stops or latches, ensures that the grow drawers remain fixed in place, maintaining stability and alignment within the housing.

FIG. 16 is a perspective view from within the stop channel of the substantially ring-shaped body while in unlocked configuration. As mentioned above, an unlocked configuration consists of a first grow drawer 150 of the plurality of grow drawers being disposed within the bottommost arc section of the opening is moveable into and out of the interior compartment through the opening. In the present example embodiment, the unlocked configuration consists of the tab 250 engaging the fastener 365 while said fastener is translating outwards away from the system's backplate 145. The fastener being attached to a threaded rod 370, as shown in FIG. 15, translates back and forth is directions A and B pushing the drawer tab forwards towards the user and backwards towards the backplate. As mentioned above the stop may be powered manually or automatically dependent on the system and the user's preference.

Referring to FIGS. 17 through 20, a grow light 170 is shown according to an example embodiment. In the described embodiments, the light assembly of the indoor gardening system is presented as a removable, elongated rod housing a light source. This light assembly exhibits a design that enables easy detachment and reattachment for maintenance or customization purposes. Specifically, the light assembly comprises a plurality of LED strips, wherein these LED strips may align with and correspond to a grow drawer within the system's array of light sources. The light source itself is affixed and does not rotate, remaining stationary within the system. Meanwhile, the grow drawers are designed to rotate around the fixed light source.

To ensure precise coordination between the grow drawers and the light source, the processor employed in the system closely tracks the position of each grow drawer and/or compartment. This tracking mechanism ensures that the respective proximate or nearest light source aligns with its desired cycle, thereby providing the appropriate light spectrum and intensity based on the specific nutrient, maintenance, and growth cycles of the plant. By strategically configuring the LED strips, the system can generate different waveforms of light to accommodate varying plant requirements throughout their growth stages.

Embodiments of the indoor gardening system include various waveforms of light that can be generated to support plant growth. These waveforms encompass different combinations and intensities of specific wavelengths tailored to specific plant requirements. For instance, continuous white light, resembling natural sunlight, encompasses a broad spectrum of wavelengths spanning the visible range. This waveform facilitates general plant growth throughout various stages. Red-blue light, composed primarily of red and blue wavelengths, targets the absorption peaks of chlorophyll a and b. Red light stimulates flowering and fruiting, while blue light promotes vegetative growth and leaf development. By adjusting the intensity of these wavelengths, the system optimizes plant growth according to specific growth stages. Full-spectrum light covers a comprehensive range of wavelengths, from ultraviolet to infrared, offering a balanced mix of colors to enhance photosynthesis and overall plant health. Far-red light, spanning wavelengths between 700 to 800 nm, regulates critical plant responses like seed germination, stem elongation, and flowering. Furthermore, embodiments may include customizable light spectra, allowing users to tailor and customize the wavelengths and intensities based on the requirements of different plant species, growth stages, or specific experimental conditions. These different waveforms of light, through their precise control and customization, facilitate optimal plant growth and development within the indoor gardening system.

Importantly, the light assembly is a removable component positioned concentrically within the interior compartment of the tubular wall. This concentric arrangement optimizes space utilization and allows for efficient rotation of the grow drawers. The light assembly is removably attached to the backplate, employing mechanisms such as screws or other electrical receptors. This removable attachment facilitates easy installation and replacement of the light assembly, enabling users to customize the lighting setup based on their preferences or adapt it to accommodate different plant species.

The light assembly in the indoor gardening, household appliance system is removably attached to the backplate and is concentric to the interior compartment formed by the rotatable, tubular-shaped wall. In the context of this invention, "concentric" refers to the geometric relationship where the centerlines of the light assembly and the interior compartment share the same center point. This means that the light assembly is symmetrically positioned around the central axis of the interior compartment, ensuring that the light is uniformly distributed and balanced within the growing space. The concentric configuration allows for optimal light distribution, ensuring that the plants receive even illumination from all angles. Additionally, the removable attachment of the light assembly to the backplate enables easy installation and maintenance, providing flexibility for adjusting the lighting setup based on the specific needs of the plants. By maintaining concentricity between the light assembly and the interior compartment, the system optimizes the growing conditions and facilitates efficient plant growth and cultivation.

The light assembly's design, comprising a removable elongated rod with LED strips, a fixed light source, and concentric positioning within the interior compartment, offers enhanced flexibility, efficient lighting distribution, and precise synchronization with the rotating grow drawers. This configuration, supported by the processor's tracking capabilities, contributes to an optimized indoor gardening experience, promoting healthy plant growth and maximizing productivity and yield.

Figure 17:
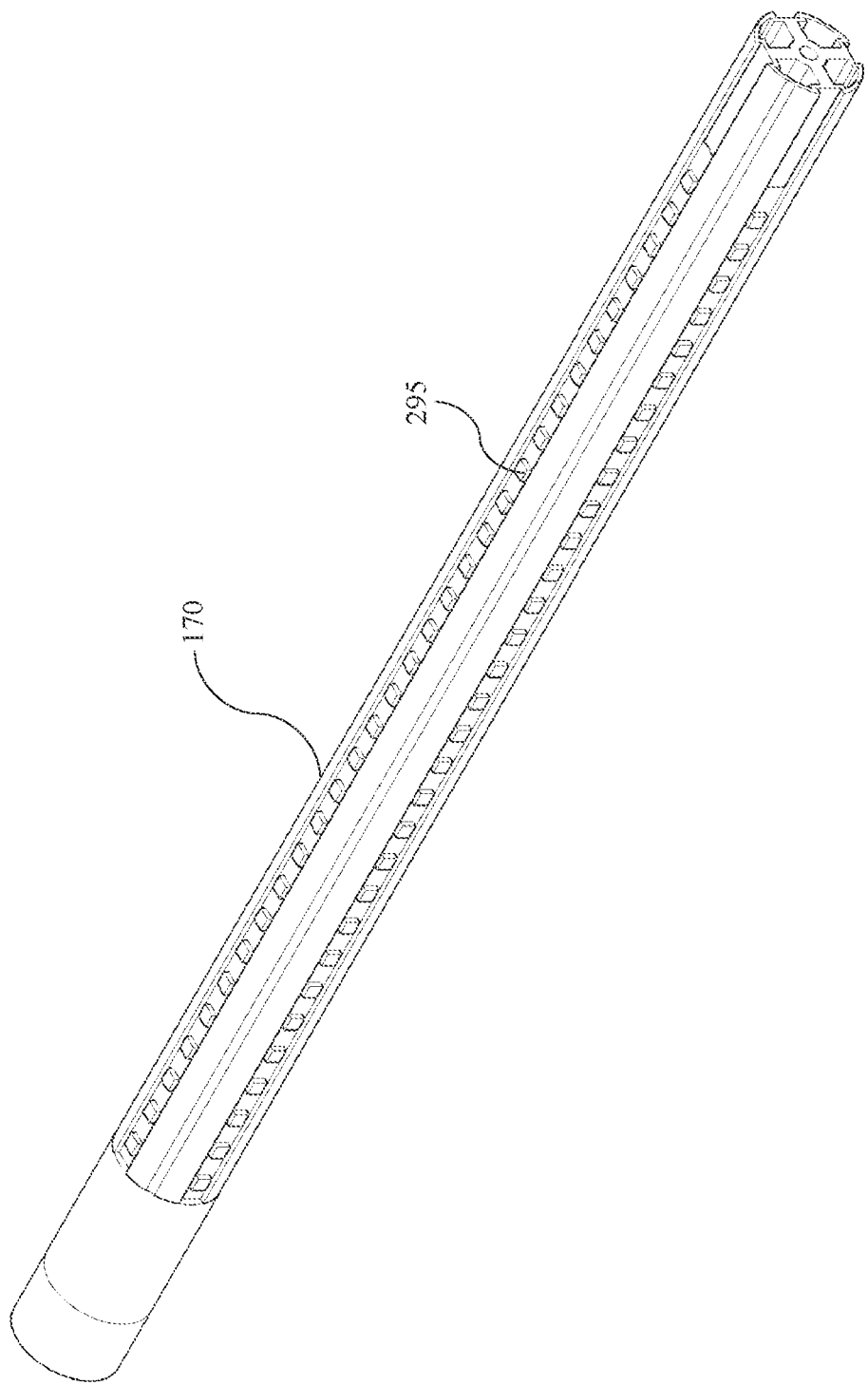
FIG. 17 is a perspective view of the grow light, according to a first example embodiment.

FIG. 17 is a perspective view of the grow light 170, according to a first example embodiment. As mentioned before, the grow light may be defined as an artificial light source designed to provide the necessary light spectrum for plant photosynthesis and growth. While natural sunlight provides a full spectrum of light, including all colors or the rainbow, grow lights focus on specific wavelengths that are most beneficial for plants during different stages of growth. The disclosed grow light contains an LED strip central to the axis of rotation such that the light emitted may reach each drawer evenly. Similar to the water system, the grow light may be in communication with the processor of the indoor gardening, household appliance system. The amount of light needed may vary across the plurality of drawers. In the present embodiment, the grow light may be a cylindrical shaped body having a plurality of LEDs 295 lining the curved lateral surface such that all drawers are exposed to light simultaneously. In other embodiments, the grow light may have a single LED strip rotate about the axis such that each grow drawer is periodically exposed to the light. More specifically, the grow light assembly may be defined as having an illuminating rod disposed within the rotatable drum and affixed to a central axis of rotation of the rotatable drum.

Figure 18:
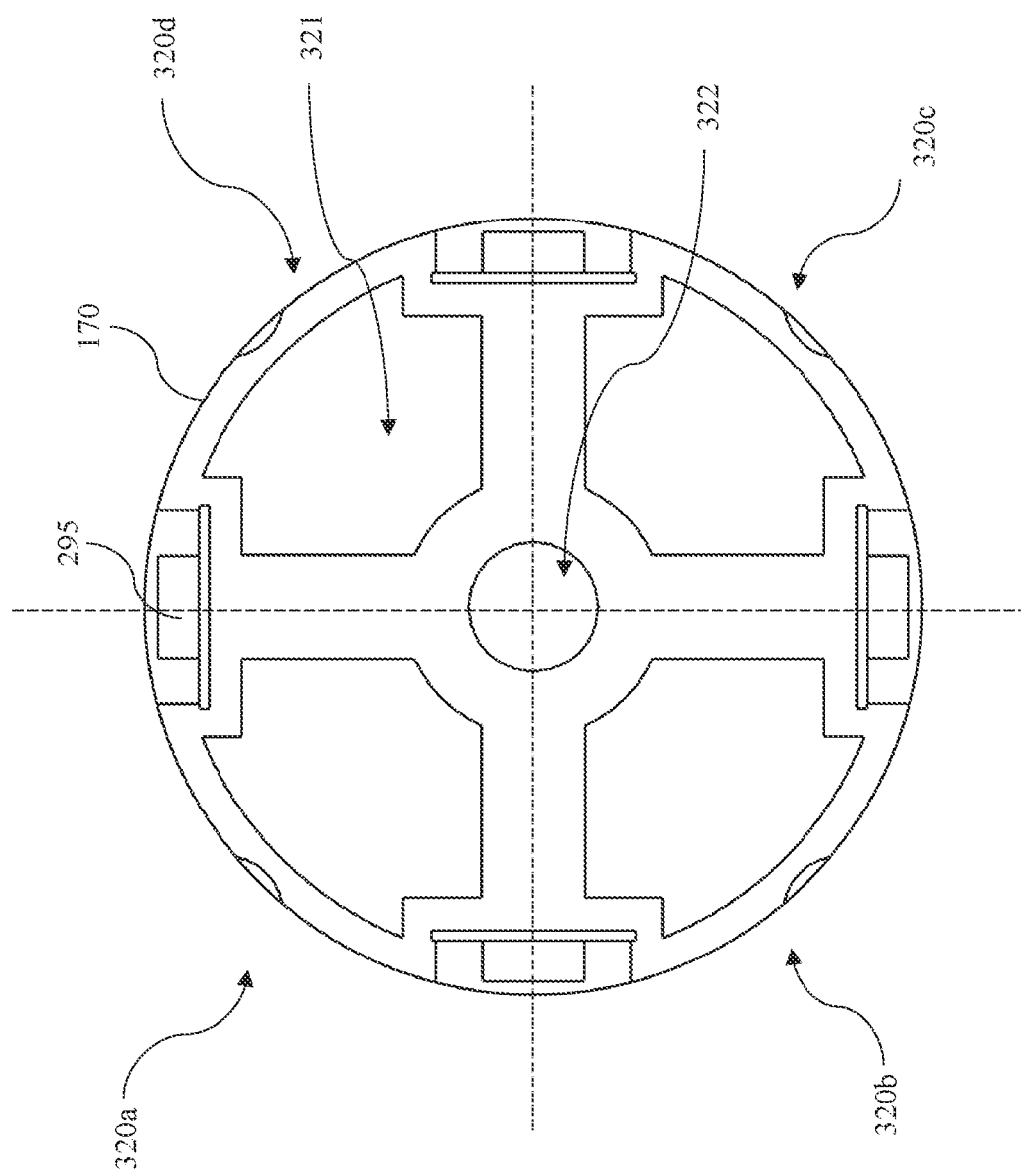
FIG. 18 is a front view of the grow light, according to an example embodiment.

FIG. 18 is an example embodiment of a front view of the grow light illustrating the four quadrants 320a, 320b, 320c, and 320d of the grow light. These quadrants may include built in control mechanisms, wiring for adjustment, heat sinks or cooling channels, power source channels, etc. In the present embodiment, individual LEDs 295 are also shown in four sections of the grow light assembly. In other embodiments, the grow light may include segmented sections for LED's, having at least one section of LEDs on the light rods. For example, in another embodiment, the grow light may be hexagonal shaped having LED strip located on each flat portion of the rod, resulting in a total of six (6) strips for example. In other embodiments, the grow light may only have a single strip of LEDs such that the grow light provides light only to the drawers that are directly proximate to the light source.

In certain embodiments, the light rod of the indoor gardening system incorporates internal heat sinks, 321 and 322, to facilitate the dissipation of heat generated by the LEDs. These heat sinks are strategically designed and integrated within the light rod to effectively dissipate thermal energy and prevent overheating of the LED components. The heat sinks may comprise a series of protrusions, fins, or other heat-dissipating structures that increase the surface area exposed to the surrounding environment.

Furthermore, in other embodiments, the heat sinks within the light rod may be configured to facilitate the flow of a cooling fluid, such as air or water, for more rapid heat dissipation. This configuration enhances the cooling efficiency by actively circulating the cooling medium within the heat sinks. In the case of air cooling, the heat sinks may incorporate channels or passages through which air is directed to carry away heat from the LEDs. Alternatively, in embodiments utilizing water cooling, the heat sinks may include internal pathways or tubes for the flow of water, enabling effective heat transfer and dissipation.

The incorporation of internal heat sinks in the light rod, whether through passive heat dissipation or active cooling with a fluid medium, enhances the overall thermal management of the LED lighting system. This feature helps to regulate the operating temperature of the LEDs, ensuring their optimal performance, longevity, and reliability. By efficiently dissipating heat, the system minimizes the risk of thermal damage to the components and maintains a stable and controlled environment for plant growth.

Figure 19:
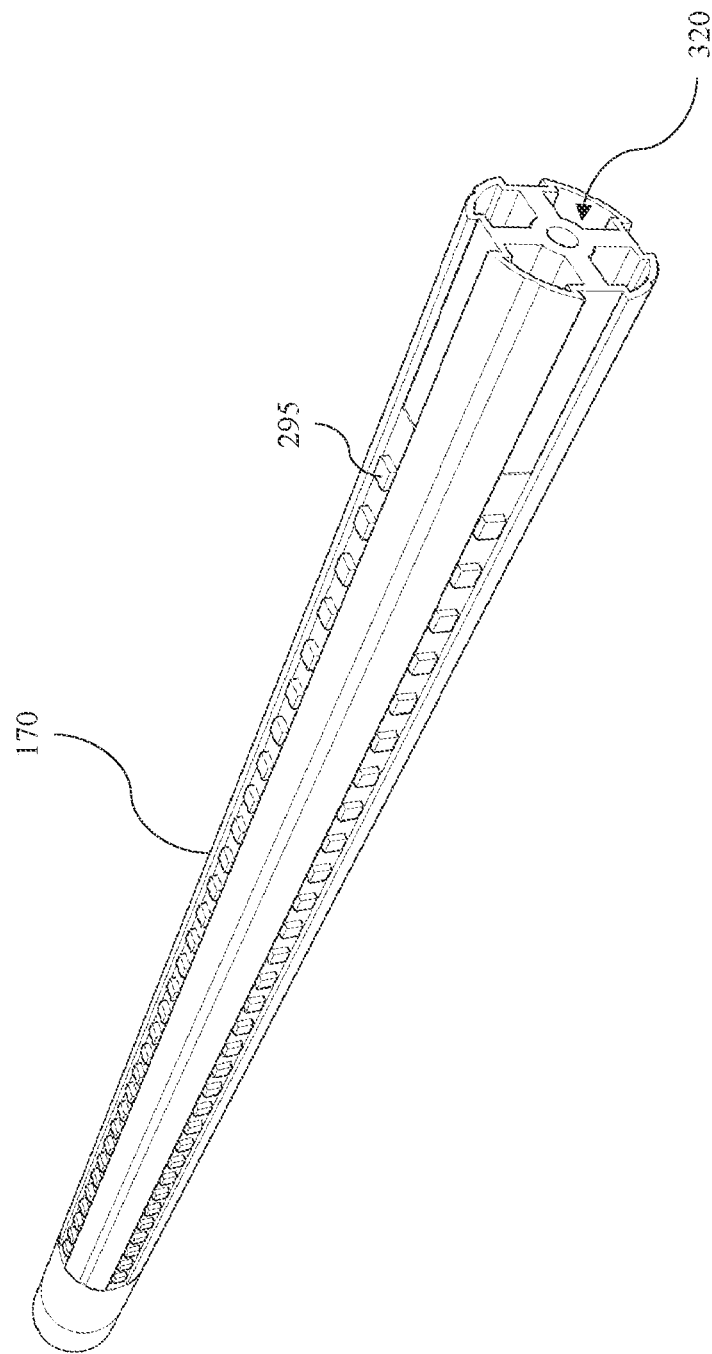
FIG. 19 is a perspective view of the grow light, according to a second example embodiment.

FIG. 19 is a perspective view of the grow light, according to a second example embodiment. This example embodiment includes the grow light 170 having a plurality of LEDs 295 and four quadrants 320(*a-d*). The light rod within the indoor gardening system is elongated and extends substantially along the length of the central axis of the rotatable tubular body. In this configuration, the light rod spans a significant portion of the interior space within the rotatable tubular body. It is designed to be elongated to maximize the coverage of light throughout the system, ensuring uniform illumination of the plants within the grow drawers.

By extending along the central axis, the light rod ensures that the light source is positioned centrally within the system, providing a symmetrical and balanced distribution of light. This arrangement allows for efficient exposure of the plants to light from all sides as the grow drawers rotate around the central axis. The elongated nature of the light rod enables it to reach the full length of the rotatable tubular body, maximizing the utilization of the available space within the system. This design ensures that the plants in all the grow drawers receive adequate light exposure for their growth and development.

The positioning of the elongated light rod along the central axis of the rotatable tubular body contributes to an optimized lighting setup, promoting consistent and efficient light distribution throughout the system. This configuration facilitates uniform illumination of the plants, enabling optimal photosynthesis and supporting their healthy growth within the indoor gardening system.

Figure 20:
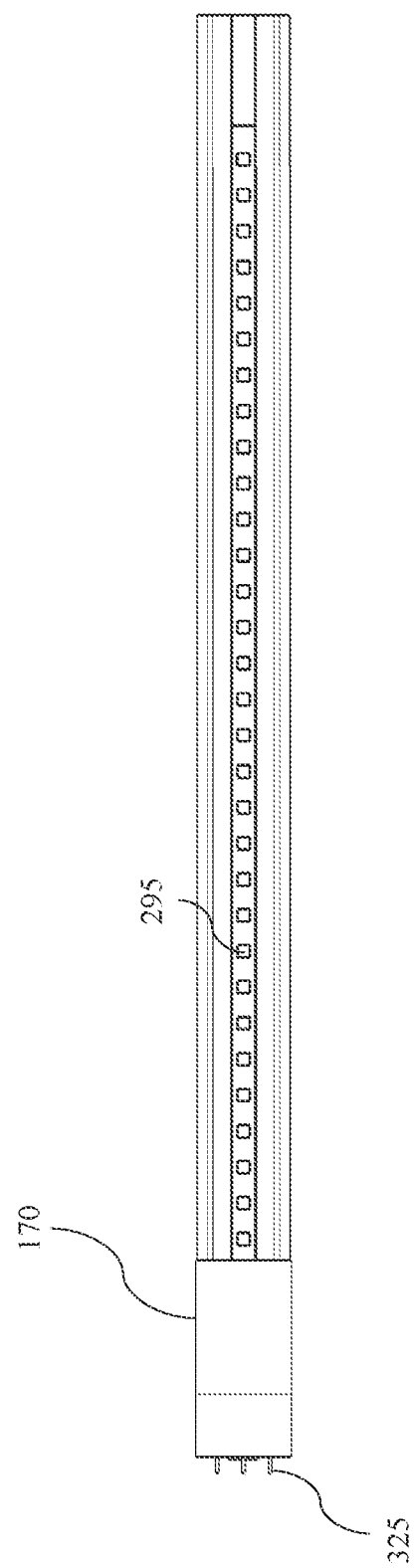
FIG. 20 is a side view of the grow light, according to an example embodiment.

FIG. 20 is a side view of the grow light, according to an example embodiment. This embodiment includes a connector 325. This connector may be referred to as a plug and may be generally defined as an electrical component that is to be inserted into a corresponding receptacle to establish an electrical connection. The number and configuration of prongs may vary dependent on the specific plug type and electrical standard used in the particular region where the system is located. This connector may be used to provide power to the light as well as automation from the systems processor. The LEDs used for the grow light may include standard LEDs, RGB LEDs, High-Power LEDs, organic LEDs, ultraviolet LEDs, infrared LEDs, etc.

Figure 21:
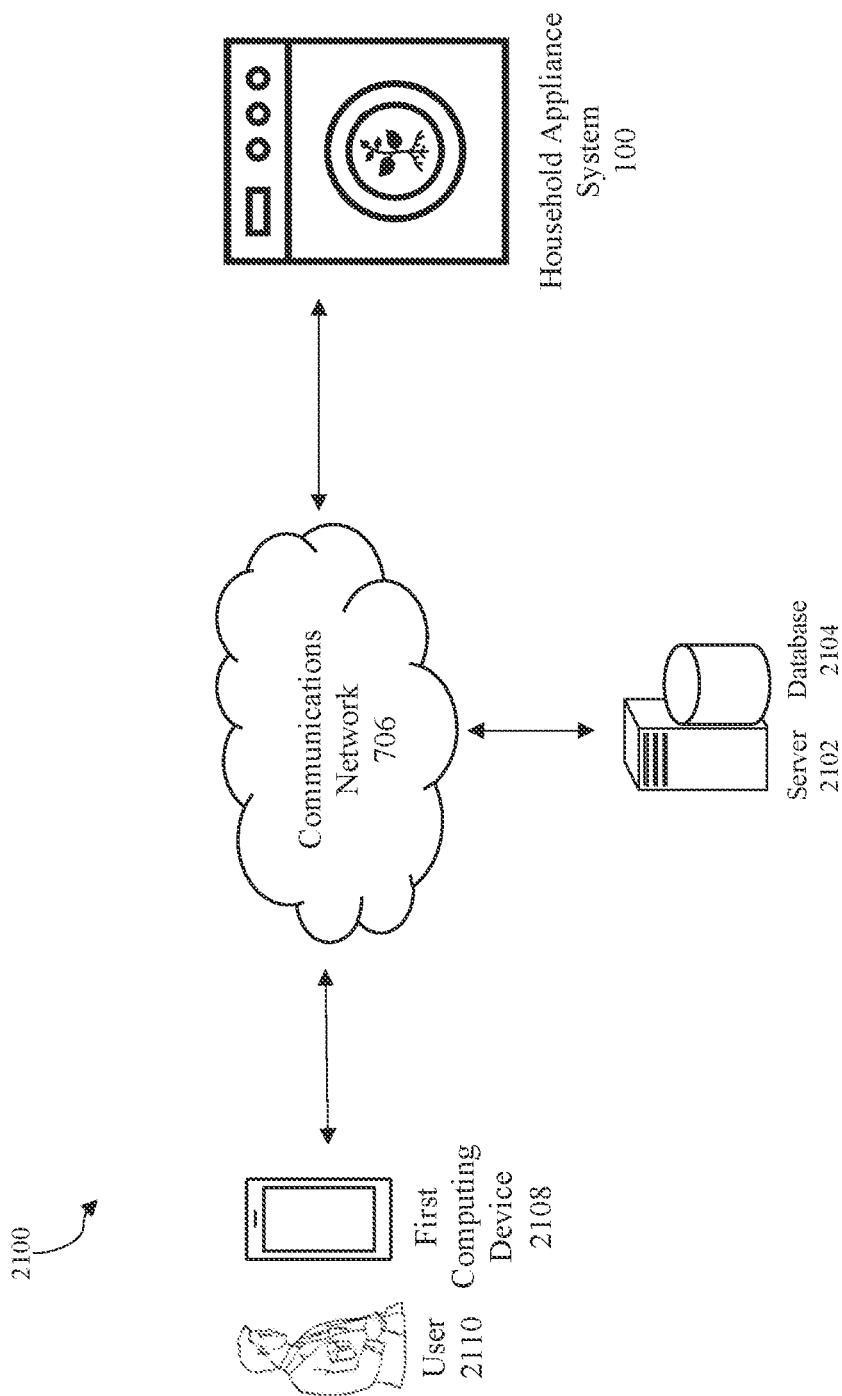
FIG. 21 is a diagram of an operating environment that supports a system for providing an indoor gardening, household appliance, according to an example embodiment.
Figure 22:
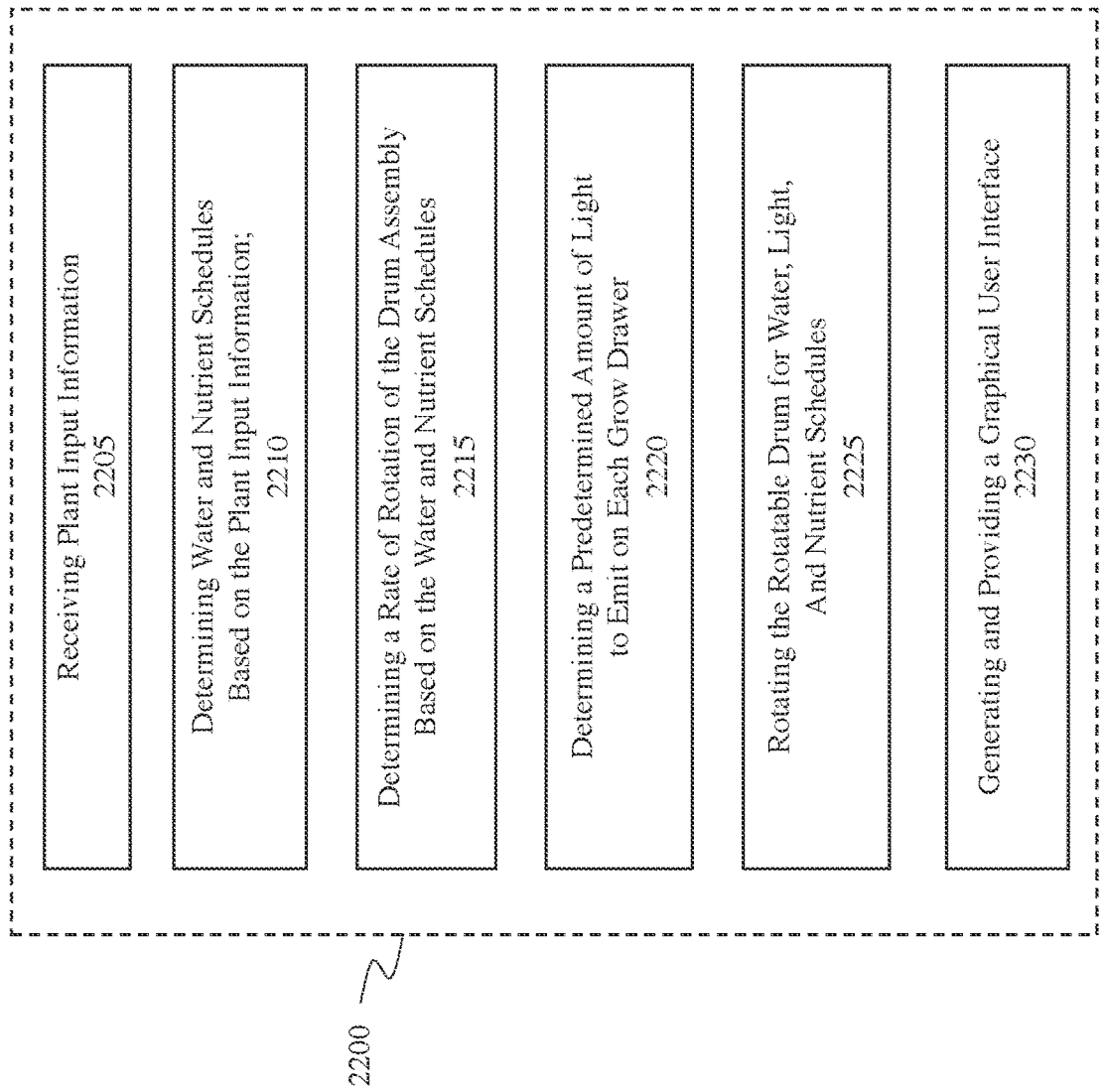
FIG. 22 is a flowchart diagram illustrating steps for a method performed by the processor of the system, according to an example embodiment.

Referring now to FIG. 21 and FIG. 22, a diagram of an operating environment 2100 that supports an indoor gardening, household appliance system 100, according to an example embodiment. FIG. 22 is a flowchart diagram of a method 2200 performed by the processor of the system, according to an example embodiment. Specifically, the system operates within an interconnected environment that facilitates communication between the system, a first user on a computing device, and a connected database storing nutrient, maintenance, and growth information about particular plant species. The system leverages this networked infrastructure to provide efficient and effective indoor gardening capabilities while offering enhanced control, convenience, and real-time monitoring for the user. The operating environment encompasses various components and systems that work collaboratively to implement the disclosed method.

In one embodiment, the operating environment includes a network infrastructure, comprising a communications network 2106 that facilitates the exchange of data between multiple computing devices, such as first computing device 2108, and household appliance 100. The network infrastructure may include wired and wireless communication channels, routers, switches, and other networking components known in the art.

The most prominent element of FIG. 1 is the server 2102 associated with repository or database 2104, which collectively define the first computing device 2108, and further coupled with network 2106, which can be a circuit switched network, such as the Public Service Telephone Network (PSTN), a packet switched network, such as the Internet or the World Wide Web, the global telephone network, a cellular network, a mobile communications network, or a Personal Area Network (PAN), such as Bluetooth®, or any combination of the above. In one embodiment, network 2106 is a secure network wherein communications between endpoints are encrypted so as to ensure the security of the data being transmitted. Server 2102 is a central controller or operator for the functionality that executes on at least one first computing device 2108, via various methods, and includes at least one processor of the system.

Within the network infrastructure, the disclosed method is executed by at least one processor, operating on a non-transitory recording medium. The processor may be communicably connected to the communications network, allowing for data transmission and reception. The server 2102 may include a software engine that delivers applications, data, program code and other information to networked devices. The software engine of server may perform other processes such as transferring multimedia data in a stream of packets that are interpreted and rendered by a software application as the packets arrive. FIG. 1 further shows that server 2102 includes a database or repository 2104, which may be a relational database comprising a Structured Query Language (SQL) database stored in a SQL server or a database that adheres to the NoSQL paradigm. It is understood that other components of the system may also include databases.

In the present invention, a connected database, denoted as 2104, is utilized to store nutrient, maintenance, and growth information about particular plant species. The database 118 forms an integral component of the operating environment, providing a comprehensive and centralized repository of plant-related data that enhances the functionality and effectiveness of the system. The database 2104 is communicatively coupled with the system 100 via the communications network 2106. This networked connection allows seamless and real-time access to the wealth of information stored in the database 2104, empowering the system to deliver optimal care and guidance for a wide range of plant species.

The database 2104 is designed to store and organize plant-specific information in a structured manner, enabling efficient retrieval and utilization by the system 100. This information encompasses nutrient requirements, maintenance guidelines, growth patterns, and other relevant parameters associated with various plant species. By encompassing a wide range of plant types, the database 2104 caters to the diverse needs and preferences of users engaging in indoor gardening.

The database 2104 may include a plurality of data tables, each structured to store specific categories of information. These tables may include, but are not limited to, plant identification data, water and nutrient schedules, maintenance instructions, growth parameters, and user preferences. The plant identification data table includes fields to store plant species names, taxonomy details, and other identifying characteristics necessary for accurate plant recognition. The database utilized in the system may comprise a plurality of data tables, providing a structured and organized repository for storing various plant-related information. These data tables include, but are not limited to, examples such as plant identification data, water schedules, nutrient schedules, maintenance instructions, growth parameters, and user preferences. The plant identification data table stores information such as plant species names, taxonomy details, and identifying characteristics. The water schedules table within the indoor gardening system contains information pertaining to the timing and frequency of watering cycles for various plant species and growth stages. The nutrient schedules table contains recommended nutrient compositions and feeding schedules specific to different plant species and growth stages. The maintenance instructions table offers detailed guidance on plant care, including watering routines, pruning techniques, and disease prevention. The growth parameters table captures essential data on environmental factors that influence plant growth, such as temperature ranges, humidity levels, and light requirements. Finally, the user preferences table allows users to customize their gardening experience based on their preferences, such as preferred plant species, cultivation techniques, and meal suggestions based on available produce. It should be noted that these examples are non-limiting, and additional data tables can be incorporated to accommodate a wide range of plant-related information and evolving industry practices.

In one example embodiment, the nutrient schedules table within the database 2104 stores recommended nutrient compositions and feeding schedules for different plant species at various growth stages. This information is tailored to specific plants' requirements and ensures the optimal provision of essential nutrients for healthy growth and development.

Additionally, the maintenance instructions table provides detailed guidance on plant care, encompassing watering routines, pruning techniques, disease prevention, and other relevant maintenance tasks. This information assists users in effectively managing their plants and maintaining their overall health and vitality.

The growth parameters table captures critical growth-related data, such as ideal temperature ranges, humidity levels, light requirements, and other environmental factors necessary for promoting robust plant growth. By referencing this table, the system 100 can create an environment conducive to the specific needs of each plant species.

The user preferences table allows individual users to customize their gardening experience based on personal preferences. This table encompasses information regarding preferred plant species, specific cultivation techniques, meal preferences based on available produce, and other user-specific settings. By incorporating user preferences, the system 100 can provide personalized recommendations and suggestions, tailoring the indoor gardening experience to the user's unique tastes and requirements.

In operation, the system 100, facilitated by the processor, retrieves relevant data from the database 2104 based on user input, plant identification, and growth stage. The processor accesses the appropriate data tables within the database 2104 to retrieve accurate and up-to-date information for each plant species. This dynamic integration between the system 100 and the database 2104 ensures that the indoor gardening process is guided by scientifically backed data, resulting in improved plant health, productivity, and user satisfaction.

In the described operating environment, the system 100 seamlessly interacts with a first user, who utilizes a first computing device 2108, such as a smartphone, tablet, or computer, to input plant information. The system 100, incorporating the processor and its communication capabilities, receives and processes this user input, queries the connected database 2104, and determines appropriate nutrient cycles for the specific plant species.

In operation, the first user accesses a dedicated application or user interface on the first computing device 2108, specifically designed to facilitate seamless interaction with the system 100. The user interface provides intuitive options and fields for entering plant information, including but not limited to plant species, growth stage, and any specific preferences or requirements the user may have.

As the first user inputs the plant information, the first computing device 2108 establishes communication with the system 100 over the communications network 2106. The user input, containing essential data about the plant species and its specific characteristics, is transmitted to the system 100 for further processing and analysis.

In one embodiment of the invention, the plant input information primarily consists of general information input by the first user, particularly pertaining to the plant species. The remaining detailed plant information, including specific nutrient requirements, growth stages, maintenance guidelines, and other relevant data, is stored within the connected database. This embodiment leverages the interconnected nature of the system, allowing the user to provide high-level information such as the plant species while relying on the extensive plant database to retrieve and utilize comprehensive and specific plant-related data. By accessing the connected database, the system can retrieve the necessary information corresponding to the identified plant species and utilize it to determine optimal nutrient cycles, growth strategies, and other care routines tailored to the specific plant's needs. This embodiment facilitates an efficient and streamlined process, enabling users to input minimal plant information while still benefiting from the comprehensive plant knowledge stored in the database.

In another example embodiment, plant input information may refer to a comprehensive set of data and details provided by a user or an individual concerning a specific plant or plants. The plant input information encompasses various aspects of the plant's characteristics, requirements, and growth stage, which are pivotal for ensuring effective care and cultivation. In particular, the plant input information includes the identification of the plant species, such as rose, tomato, or basil, as different plant species possess unique growth patterns, nutrient requirements, and care guidelines. Additionally, the plant input information specifies the growth stage of the plant, delineating stages like seedling, vegetative growth, flowering, or fruiting, since each growth stage necessitates distinct care routines. Moreover, the plant input information may incorporate details regarding the plant's size, encompassing its current dimensions, which can impact factors such as light requirements, space utilization, and pruning techniques. Furthermore, the plant input information may encompass environmental conditions, providing information about temperature, humidity, light availability, and air circulation, as these conditions exert an influence on the plant's growth and overall health. Watering preferences are also included in the plant input information, indicating the desired watering routine for the plant, which may vary based on factors such as the plant's natural habitat, soil moisture requirements, and susceptibility to overwatering or underwatering. Additionally, the plant input information may contain nutrient preferences, specifying the particular nutrient requirements or preferences of the plant, including the type of fertilizers or nutrients that are beneficial for its growth, thereby aiding in the determination of appropriate nutrient cycles and feeding schedules. Finally, the plant input information may incorporate user preferences, comprising any additional preferences or requirements provided by the user, such as organic cultivation, specific fertilizers or pesticides to be used, or desired growth outcomes. By analyzing and leveraging the plant input information, the system can tailor its care routines, nutrient cycles, and growth strategies to suit the specific needs of the plant, thereby optimizing its health, productivity, and overall growth.

At step 2205, the processor within the system 100 receives plant input information for at least one plant from the first computing device. Prior to step 2205, a user 2110 of the system enters the plant input information by interacting with the first computing device 2108. Then, upon receiving the user input, the processor initiates step 2210 to determine the water and nutrient schedules for the plants based on the plant input information. Leveraging its computational capabilities, the processor queries the connected database, specifically accessing the water schedules table and nutrient schedules table.

The processor matches the plant species identified by the plant input information with the corresponding entry within the plant identification data table stored in the database. This matching process ensures accurate identification and retrieval of relevant water cycle and nutrient cycle information specific to the plant species in question. With the plant species identified, the processor retrieves the corresponding water cycle and nutrient cycle information from the nutrient schedules table within the database 2104.

The processor further analyzes the retrieved water schedule and nutrient schedule information, taking into consideration factors such as the plant's growth stage, environmental conditions, and any additional user preferences or requirements specified during the initial plant information input. By applying algorithms and predefined rules, the processor determines the optimal water and nutrient schedules for the specific plant species within the given context.

Based on the determined water and nutrient schedules, the processor generates instructions or commands to regulate the system's operation accordingly. These instructions may involve controlling the amount and timing of water and nutrient delivery, adjusting the rotational speed of the drum assembly, and coordinating the lighting conditions provided by the grow light assembly. The determined water and nutrient cycles, tailored to the specific plant species and growth stage, ensure the delivery of water and essential nutrients at appropriate intervals, promoting healthy and vigorous plant growth.

The processor, in conjunction with the graphical user interface provided by the system, may also present the nutrient cycle information to the first user on the first computing device. This user interface allows the first user to visualize and understand the recommended nutrient cycles and provides an opportunity for customization or further input based on the user's preferences.

It should be noted that the water and nutrient cycle determination process, involving user input, database querying, and algorithmic analysis, is iterative and dynamic. As the plant progresses through different growth stages or as the user provides updated information, the processor re-evaluates and adjusts the water and nutrient schedules, ensuring ongoing optimization and customization to meet the plant's changing needs.

In step 2215, the processor determines the rate of rotation of the drum assembly based on the water and nutrient schedules. The processor calculates a rate of rotation that conforms to the water and nutrient schedules to ensure that the plants are receiving water and nutrients that the required frequency. In step 2220, the processor determines a predetermined amount of light to emit on each grow drawer of the plurality of grow drawers, using the grow light assembly, depending on where the grow drawer is rotated about the cylindrical rotating drum and where it is within the growth cycle. In step 2225, once the processor calculates the rate of rotation of the rotatable drum, the processor causes the system to rotate the rotatable drum for water, light, and nutrient schedules. In step 2230, the processor generates a graphical user interface for controlling and alerting an end user to the state of the appliance. controlling and alerting an end user to the state of the appliance may include, but is not limited to, inputting plant species, controlling light wavelength, power output and schedule, water and nutrient schedules, rotation timing, plant trimming and pollination, plant harvesting suggestions, and meal suggestions based on available produce. Then, the processor provides the graphical user interface to the first computing device by sending the graphical user interface over the communications network 2106 such that the first computing device receives the graphical user interface.

The method described herein is not limited to the particular order of the disclosed steps. While the disclosed order provides certain improvements over the prior art, it should be understood that the method steps can be rearranged, modified, or performed in alternative sequences without departing from the scope of the disclosure. In certain embodiments, the method steps may occur concurrently, simultaneously, independently, dependently, or in any other suitable manner, as determined by the specific implementation and requirements. The flexibility of the method allows for adaptability and optimization based on various factors, such as system resources, data availability, and user preferences. Therefore, the specific arrangement and order of the method steps should be interpreted as illustrative rather than limiting, and the disclosure encompasses all variations, modifications, and alternatives falling within the scope of the appended claims.

Figure 23:
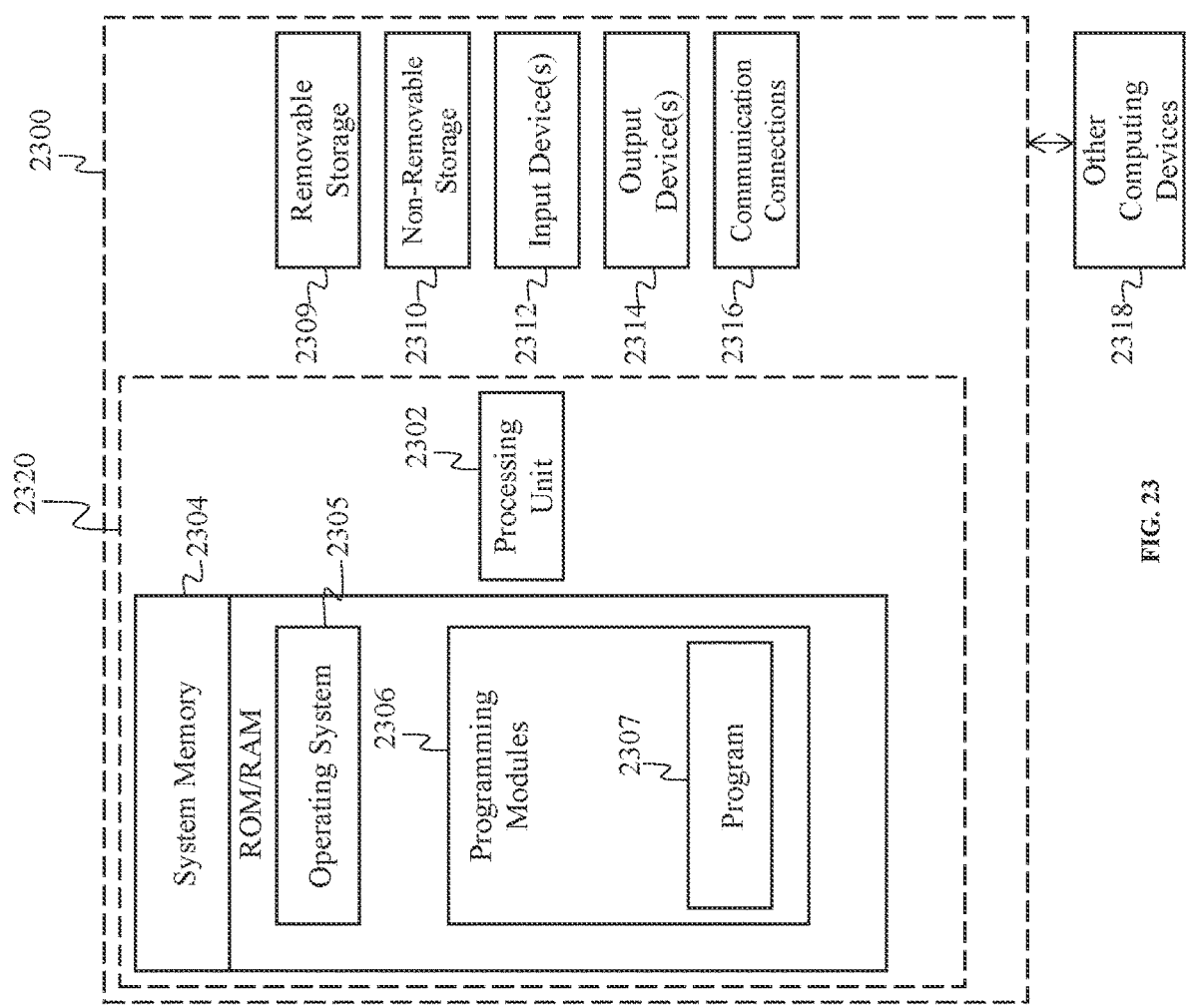
FIG. 23 illustrates a computer system according to exemplary embodiments of the present technology.

Referring now to FIG. 23, a computer system according to exemplary embodiments of the present technology is shown. The system includes an example computing device 2300 and other computing devices are shown, according to an example embodiment. Consistent with the embodiments described herein, the aforementioned actions performed by the methods and system disclosed herein may be implemented in a computing device, such as the at least one processor. Any suitable combination of hardware, software, or firmware may be used to implement the at least one processor. The aforementioned system, device, and processors are examples and other systems, devices, and processors may comprise the aforementioned computing device. Furthermore, the at least one processor may comprise an operating environment for the system and methods herein. Processes, data related to systems and methods herein may operate in other environments and are not limited to the at least one processor.

A system consistent with an embodiment of the disclosure may include a plurality of computing devices, such as a computing device 2300 of FIG. 23. In a basic configuration, computing device 2300 may include at least one processing unit 2302 and a system memory 2304. Depending on the configuration and type of computing device, system memory 2304 may comprise, but is not limited to, volatile (e.g., random access memory (RAM)), non-volatile (e.g., read-only memory (ROM)), flash memory, or any combination or memory. System memory 2304 may include operating system 2305, and one or more programming modules 2306. Operating system 2305, for example, may be suitable for controlling computing device 2300's operation. In one embodiment, programming modules 2306 may include, for example, a program module 2307 for executing the methods illustrated in FIG. 23. Furthermore, embodiments of the disclosure may be practiced in conjunction with a graphics library, other operating systems, or any other application program and is not limited to any particular application or system. This basic configuration is illustrated in FIG. 23 by those components within a dashed line 2320.

Computing device 2300 may have additional features or functionality. For example, computing device 2300 may also include additional data storage devices (removable and/or non-removable) such as, for example, magnetic disks, optical disks, or tape. Such additional storage is illustrated in FIG. 23 by a removable storage 2309 and a non-removable storage 2310. Computer storage media may include volatile and nonvolatile, removable, and non-removable media implemented in any method or technology for storage of information, such as computer readable instructions, data structures, program modules, or other data. System memory 2304, removable storage 2309, and non-removable storage 2310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 2300. Any such computer storage media may be part of system 100. Computing device 2300 may also have input device(s) 2312 such as a keyboard, a mouse, a pen, a sound input device, a camera, a touch input device, etc. Output device(s) 2314 such as a display, speakers, a printer, etc. may also be included. The aforementioned devices are only examples, and other devices may be added or substituted.

Computing device 2300 may also contain a communication connection 2316 that may allow system 100 to communicate with other computing devices 2318, such as over a network in a distributed computing environment, for example, an intranet or the Internet. Communication connection 2316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 2304, including operating system 2305. While executing on at least one processing unit 2302, programming modules 2306 (e.g., program module 2307) may perform processes including, for example, one or more of the stages of a process. The aforementioned processes are examples, and at least one processing unit 2302 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Figure 24:
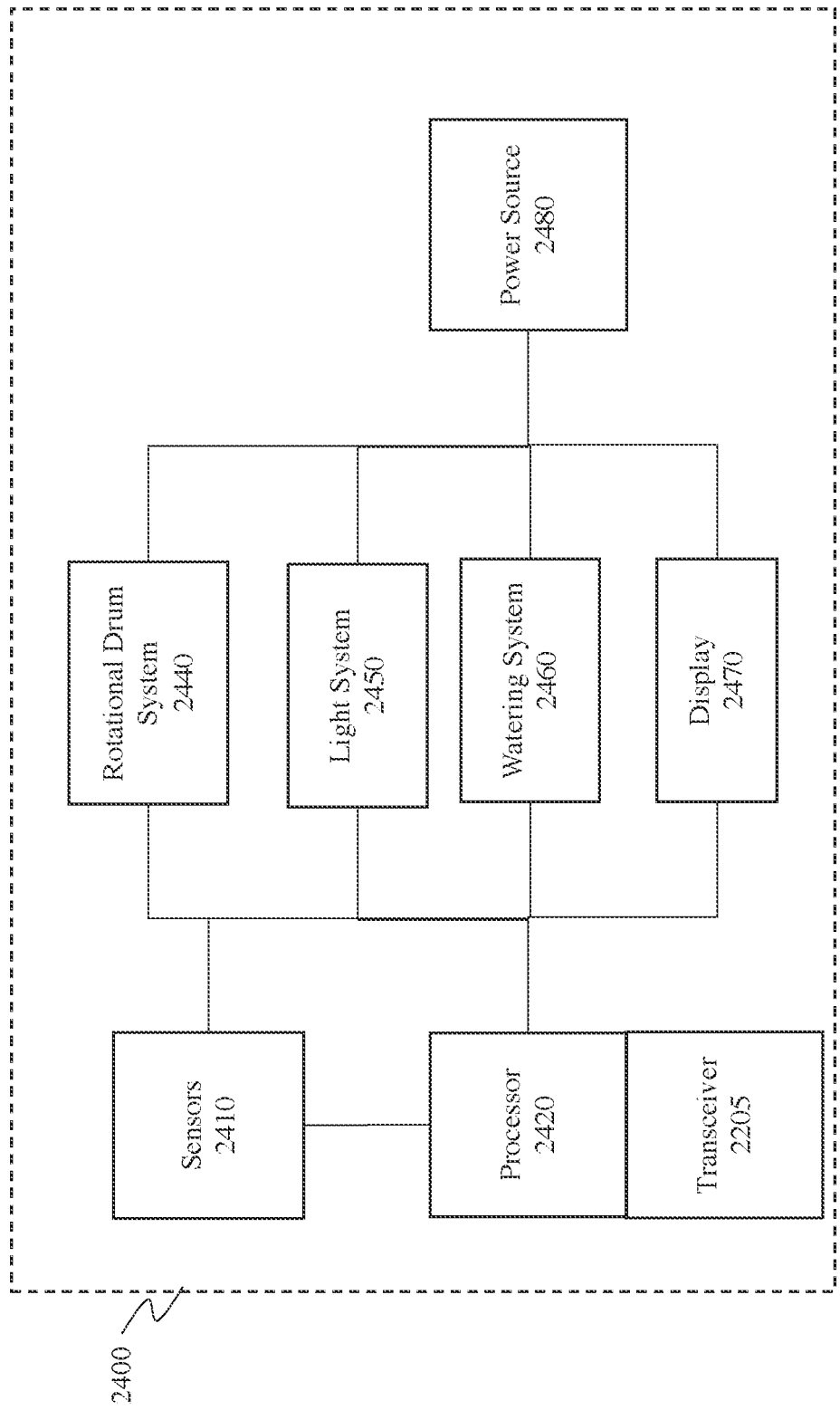
FIG. 24 is a diagram illustrating the main electrical components of the system and communication therebetween for providing an indoor gardening, household appliance, according to an example embodiment.

Referring now to FIG. 24, a basic diagram demonstrating the electrical connections and communication among various components of the system is shown according to an example embodiment. The system includes a housing 2400 that encloses all the components, ensuring their secure and integrated operation. FIG. 24 is provided as an overview of the disclosure and should not be interpreted as an exhaustive representation of all the components and their interactions within the system. It is understood that the specific parts depicted in FIG. 24 may include additional components or variations thereof, as described elsewhere in the present disclosure. The inclusion of such components within the depicted figure is intended to exemplify the embodiments and should be construed in the spirit and scope of the present disclosure. The embodiments encompass all the components and their variations described herein, which may be incorporated into the system to achieve similar functionalities or serve analogous purposes. The specific arrangement and composition of the components can be modified without departing from the essential features and principles disclosed herein. Therefore, the limitations of FIG. 24 should not restrict the broad scope of the present disclosure, as defined by the appended claims.

Sensors 2410 are strategically placed throughout the system to monitor various parameters relevant to indoor gardening. These sensors may detect and/or measure factors such as temperature, humidity, soil moisture, and other environmental conditions necessary for optimal plant growth. The system may incorporate various types of sensors to monitor and collect data related to indoor gardening. These sensors include temperature sensors for measuring ambient temperature, humidity sensors for monitoring moisture levels in the air, soil moisture sensors for assessing soil moisture content, light sensors for detecting light intensity and duration, pH sensors for measuring soil or nutrient solution acidity/alkalinity, CO2 sensors for monitoring carbon dioxide concentration, nutrient sensors for measuring nutrient levels, and motion sensors for detecting movement within the system. These sensors provide real-time data that enables the system to optimize environmental conditions, adjust watering and nutrient cycles, and ensure proper plant growth. It should be understood that the aforementioned examples are not exhaustive, and other types of sensors may be incorporated into the system based on specific requirements and functionalities.

The system may further include sensors dedicated to monitoring the operational status and maintenance of specific system components. These sensors enable the system to detect and assess the performance of various parts, such as motor speed sensors to ensure proper rotation of the drum assembly, water level sensors to monitor the reservoir levels in the watering system, and filter sensors to indicate the need for filter cleaning or replacement. Additionally, the system may incorporate sensors for operational controls, such as user interface sensors to detect user inputs and facilitate interaction with the system, and safety sensors to ensure the system's compliance with safety regulations and prevent potential hazards. By incorporating these additional sensors, the system can effectively monitor and maintain the operational integrity of its components, ensuring optimal performance and user safety. It should be understood that these examples are illustrative and not limiting, and other types of sensors for maintenance and operational controls may be incorporated into the system as required.

At least one processor 2420 positioned within the housing serves as the central control unit of the system. The processor receives data from the sensor(s), processes the information, and executes instructions based on predefined algorithms and user input. It manages the overall operation and coordination of the system's functionalities.

A transceiver 2430 enables communication between the system and external devices or networks. This component facilitates the exchange of data, commands, and status updates, whether through wireless signals or wired connections, thereby allowing integration with other smart devices, remote control, or data transfer to and from external systems.

The rotational drum system 2440 is an essential component responsible for the movement of the grow drawers and their respective contents. It includes a motor or other suitable mechanism that rotates the drum assembly, ensuring proper exposure of plants to light, facilitating watering cycles, and optimizing space utilization within the system.

The light system 2450 consists of illumination sources, such as LED lights, strategically positioned within the housing. These lights emit specific wavelengths and intensities, providing the necessary light energy for photosynthesis and promoting plant growth. The light system is controlled and regulated by the processor based on plant requirements, growth stages, and user preferences.

The watering system 2460 within the housing facilitates the automated delivery of water and nutrients to the plants. It includes reservoirs, pumps, valves, and distribution mechanisms to ensure controlled and efficient watering cycles. The watering system operates in coordination with the processor to provide customized irrigation schedules based on plant species, growth stages, and environmental conditions.

A display 2470 may be incorporated into the housing, providing visual feedback and information to the user. The display presents real-time data, system status, nutrient cycles, growth progress, alerts, and user interface options for configuring settings and accessing system functionalities. The display enables convenient and user-friendly interaction with the system. The display within the system can take various forms, including an LCD display or display indicators with sound feedback and visual feedback. In one embodiment, an LCD display is integrated into the housing, providing a visual interface for presenting real-time data, system status, nutrient cycles, growth progress, alerts, and user interface options. The LCD display offers a clear and easily readable representation of information to the user, enhancing their interaction with the system.

In an alternative embodiment, the display may consist of display indicators accompanied by sound feedback. These display indicators can be in the form of LED lights or other visual indicators that convey important system information, such as indicating nutrient cycles, watering schedules, or system statuses. Sound feedback, such as audible alerts or notifications, can accompany these visual indicators to provide an additional means of communication and user feedback.

These embodiments of the display ensure that the user can easily monitor and comprehend critical system information and prompts, enabling effective control and interaction with the indoor gardening system. It should be understood that the choice of LCD display or display indicators with sound feedback and visual feedback is not limiting, and other display technologies or combinations thereof can be employed within the system based on design preferences and functional requirements.

A power source 2480 supplies electrical energy to the entire system. It may comprise batteries, an external power adapter, or a combination thereof, ensuring continuous and reliable operation. The power source provides the necessary electrical power to drive the various components and subsystems within the system.

Through the integration of these components, the system offers an advanced indoor gardening solution. The sensors provide crucial environmental data, which is processed by the processor to optimize the performance of the rotational drum system, light system, and watering system. The transceiver enables seamless communication, while the display provides visual feedback and user interaction. Together, these elements work harmoniously to create an efficient, automated, and user-friendly indoor gardening experience.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. It is also understood that components of the system may be interchangeable or modular so that the components may be easily changed or supplemented with additional or alternative components.

While certain embodiments of the disclosure have been described, other embodiments may exist. Furthermore, although embodiments of the present disclosure have been described as associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An indoor gardening, household appliance system comprising:
   a) a housing having a front side and a plurality of enclosed sides;
   b) an opening on the front side of the housing;
   c) a rotatable tubular shaped wall disposed inside the housing that is concentric with the opening, the rotatable tubular shaped wall comprising (i) an inner surface, (ii) an interior compartment, and (iii) a back side;
   d) a backplate in attachment with the back side of the rotatable tubular shaped wall;
   e) a plurality of grow drawers movably attached about the inner surface of the rotatable tubular shaped wall; and
   f) at least one stop removably engaging with at least one grow drawer of the plurality of grow drawers, wherein the at least one stop retains the at least one grow drawer within the interior compartment of the rotatable tubular shaped wall.

2. The system of claim 1 further comprising at least one lid in attachment with each grow drawer of the plurality of grow drawers, wherein the at least one lid comprises a central opening.

3. The system of claim 1, wherein the at least one grow drawer of the plurality of grow drawers is in fluid communication with the backplate such that the at least one grow drawer comprises:
   a. an inlet; and
   b. a conduit in fluid communication with a drain on the backplate.

4. The system of claim 1, wherein each grow drawer of the plurality of grow drawers comprises at least one divider to separate each grow drawer into at least a first section and a second section.

5. The system of claim 1, wherein each grow drawer of the plurality of grow drawers comprises a first hydroponic grow medium.

6. The system of claim 5, wherein the system comprises a first rate of rotation based on the first hydroponic grow medium within a first grow drawer of the plurality of grow drawers.

7. The system of claim 1 wherein the opening comprises a bottommost arc section and a top arc section.

8. The system of claim 7 further comprising:
   a. an unlocked configuration, wherein in the unlocked configuration a first grow drawer of the plurality of grow drawers disposed within the bottommost arc section of the opening is movable into and out of the interior compartment through the opening; and
   b. a locked configuration, wherein in the locked configuration a plurality of second grow drawers of the plurality of grow drawers disposed about the top arc section of the opening are prevented from being removed outside of the interior compartment.

9. The system of claim 1 further comprising at least one spacer affixed to the inner surface of the rotatable tubular shaped wall and disposed between adjacent grow drawers of the plurality of grow drawers.

10. The system of claim 9, wherein the at least one spacer further comprising at least one of (i) an elongated channel for receiving at least a portion of a first grow drawer; and (ii) a telescoping slide attached to the spacer and the first grow drawer.

11. The system of claim 1, wherein the at least one stop is a plate disposed frontward relative to a front side of a respective grow drawer.

12. The system of claim 1, wherein the at least one stop is a fastener operatively coupled to a rearward portion of the grow drawer and the backplate.

13. The system of claim 1, wherein the at least one stop is a fastener operatively coupled to a frontward portion of the grow drawer and at least one of (i) the housing, (ii) the rotatable tubular shaped wall, (iii) and a spacer.

14. The system of claim 8 further comprising a stop on a bottom side of each grow drawer of the plurality of grow drawers.

15. The system of claim 14 further comprising:
a substantially ring-shaped body;
a stop channel on the substantially ring-shaped body; and
a tab on the bottom side of each grow drawer of the plurality of grow drawers, such that when the tab is within the stop channel, each drawer of the plurality of drawers is prevented from being removed within the interior compartment when in the locked configuration;
wherein the substantially ring-shaped body substantially surrounds the plurality of grow drawers.

16. The system of claim 15, wherein the substantially ring-shaped body comprises a cutout at a bottommost arc section of the substantially ring-shaped body.

17. The system of claim 16, wherein at the cutout, the tab is received by a fastener movably attached to a rotatable, threaded rod.

18. An indoor gardening, household appliance system comprising:
   a) a housing having a front side and a plurality of enclosed sides;
   b) an opening on the front side of the housing, the opening comprising a bottommost arc section and a top arc section;
   c) a rotatable tubular shaped wall disposed inside the housing that is concentric with the opening, the rotatable tubular shaped wall comprising (i) an inner surface, (ii) an interior compartment, and (iii) a back side;
   d) a backplate in attachment with the back side of the rotatable tubular shaped wall;
   e) a plurality of grow drawers movably attached about the inner surface of the rotatable tubular shaped wall and concentric about the opening;
   f) a plurality of spacers affixed to the inner surface of the rotatable tubular shaped wall and disposed between adjacent grow drawers of the plurality of grow drawers;
   g) at least one stop removably engaging with each drawer of the plurality of grow drawers, wherein the at least one stop retains each drawer within the interior compartment, wherein the least one stop comprises a locked configuration and an unlocked configuration, wherein the stop is at least one of:
      i. a plate disposed frontward relative to a front side of a respective grow drawer;
      ii. a fastener operatively coupled to a rearward portion of the grow drawer and the backplate;
      iii. a second fastener operatively coupled to a frontward portion of the grow drawer and at least one of the housing, the opening, the rotatable tubular shaped wall, and the spacer;
   h) the unlocked configuration comprising a first grow drawer of the plurality of grow drawers disposed within the bottommost arc section of the opening and wherein the first grow drawer is movable into and out of the interior compartment through the opening; and
   i) the locked configuration comprising a plurality of second grow drawers of the plurality of grow drawers disposed about the top arc section of the opening are prevented from being removed outside of the interior compartment.

19. A household kitchen appliance system for indoor gardening, the system comprising:
   a) a housing having a front side and a plurality of enclosed sides;
   b) an opening on the front side of the housing, the opening comprising a bottommost arc section and a top arc section;
   c) a rotatable drum assembly within the housing, the drum assembly comprising a rotatable tubular shaped wall and a backplate;
   d) a grow light assembly comprising an illuminated rod disposed within the rotatable drum and affixed to a central axis of rotation of the rotatable drum;
   e) a plurality of grow drawers movably attached about an inner surface of the rotatable tubular shaped wall;
   f) at least one divider separating each of the plurality of drawers into at least a first section and a section;
   g) a lid removably attached to each of the first section and second section and each lid having a central hole for a plant to grow through;
   h) at least one stop removably engaging with each grow drawer of the plurality of grow drawers, wherein the at least one stop retains each grow drawer within an interior compartment;
   i) at least one processor;
   j) an unlocked configuration comprising a first grow drawer of the plurality of grow drawers disposed within the bottommost arc section of the opening and wherein the first grow drawer is movable into and out of the interior compartment through the opening; and
   k) a locked configuration comprising a plurality of second grow drawers of the plurality of grow drawers disposed about the top arc section of the opening and wherein the plurality of second grow drawers are retained within the interior compartment.

20. The system of claim 19, wherein the processor configured for:
   a. receiving, from a first computing device over a communications network, plant input information for at least one plant;
   b. determining water and nutrient schedules for the at least one plant based on the plant input information;
   c. determining a rate of rotation of the drum assembly based on the water and nutrient schedules;
   d. determining a predetermined amount of light to emit on each grow drawer of the plurality of grow drawers, using the grow light assembly, depending on a position of the grow drawer disposed about the rotatable drum assembly;
   e. rotating the rotatable drum for water, light, and nutrient schedules; and
   f. generating and providing a graphical user interface for controlling and alerting an end user about the system, including inputting plant species, controlling light wavelength, power output and schedule, water and nutrient schedules, rotation timing, plant trimming and pollination, plant harvesting suggestions, and meal suggestions based on available produce.

* * * * *